(12) United States Patent
Otsuka et al.

(10) Patent No.: US 8,676,786 B2
(45) Date of Patent: Mar. 18, 2014

(54) COMPUTER PRODUCT, DATA CONVERSION APPARATUS, AND CONVERSION METHOD

(75) Inventors: Hiroshi Otsuka, Kawasaki (JP); Atsuji Sekiguchi, Kawasaki (JP); Masazumi Matsubara, Kawasaki (JP); Shinya Kitajima, Kawasaki (JP); Yuji Wada, Kawasaki (JP); Yasuhide Matsumoto, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 13/275,434

(22) Filed: Oct. 18, 2011

(65) Prior Publication Data
US 2012/0158701 A1 Jun. 21, 2012

(30) Foreign Application Priority Data
Dec. 17, 2010 (JP) ................................. 2010-282301

(51) Int. Cl.
*G06F 17/30* (2006.01)
(52) U.S. Cl.
USPC ............ 707/722; 707/750; 707/802; 707/803
(58) Field of Classification Search
USPC .................................. 707/722, 802, 803, 752
See application file for complete search history.

(56) References Cited

U.S. PATENT DOCUMENTS

| 6,216,136 B1 | 4/2001 | Ronström |
| 7,881,724 B2 | 2/2011 | Park et al. |
| 2001/0007987 A1* | 7/2001 | Igata ................................. 707/3 |
| 2003/0032425 A1* | 2/2003 | Kim et al. ...................... 455/426 |
| 2005/0071359 A1* | 3/2005 | Elandassery et al. .......... 707/102 |
| 2006/0129575 A1* | 6/2006 | Lee et al. ....................... 707/100 |
| 2006/0190491 A1* | 8/2006 | Kuji ............................ 707/104.1 |
| 2007/0078909 A1* | 4/2007 | Tamatsu ......................... 707/203 |
| 2008/0235195 A1* | 9/2008 | Dettinger et al. .................. 707/3 |
| 2008/0259900 A1 | 10/2008 | Masuda |
| 2010/0281018 A1* | 11/2010 | Denuit et al. .................. 707/718 |

FOREIGN PATENT DOCUMENTS

| JP | 3-081841 A | 4/1991 |
| JP | 2001-510918 A | 8/2001 |
| JP | 2003-248675 A | 9/2003 |
| JP | 2005-078237 A | 3/2005 |
| JP | 2006-079277 A | 3/2006 |
| JP | 2006-293796 A | 10/2006 |
| JP | 2008-187551 A | 8/2008 |
| JP | 2008-245138 A | 10/2008 |
| JP | 4242056 B2 | 1/2009 |
| JP | 2009-521892 A | 6/2009 |
| WO | WO-2005/086003 | 9/2005 |

* cited by examiner

*Primary Examiner* — Cam Truong
(74) *Attorney, Agent, or Firm* — Fujitsu Patent Center

(57) ABSTRACT

A computer-readable medium storing therein a data conversion program that causes a computer to execute a process that includes receiving after a schema of a database has been changed from a former schema to a new schema, a processing request concerning the database; judging based on difference information concerning the former schema and the new schema, whether in the processing request, a condition that specifies process data subject to processing, has been changed by the new schema; searching the database for conversion data whose format is to be converted from the former schema to the new schema, the searching based on judgment results obtained at the judging and on the processing request; and converting the format of the retrieved conversion data, from the former schema to the new schema.

10 Claims, 27 Drawing Sheets

FIG.5

| CI NAME/TYPE | CHILD ELEMENT/ATTRIBUTE | VERSION |
|---|---|---|
| Server | @pname | Null |
| Server | @nickname | 2 |
| Server | @productNumber | 2 |
| Server | @name | 1 |
| Server | @id | 1 |
| Service | @name | 1 |

| ID | NAME/TYPE | DATA CONTENTS |
|---|---|---|
| SVR0001 | Server | <Server id="SVR0001" name="web01"> |
| ... | ... | ... |

| ID | CI NAME/TYPE | DATA CONTENTS |
|---|---|---|
| INC0001 | Incident | ... |
| INC0001 | Incident | ... |
| NWD0001 | NetworkDevice | ... |
| ⋮ | ⋮ | ⋮ |

| CI NAME/TYPE |
|---|
| Incident |
| NetworkDevice |

| FIRST TYPE | SECOND TYPE | FREQUENCY |
|---|---|---|
| Server | Incident | 0.3 |
| Server | NetworkDevice | 0.1 |
| Server | Service | 0.1 |
| Server | Service | 0 |

FIG.22

| ID | CI NAME/TYPE | POINT | DATA CONTENTS |
|---|---|---|---|
| SVR0001 | Server | 0 | ... |
| SVR0002 | Server | 0 | ... |
| SERVICE003 | Service | 0 | ... |
| PSVR0004 | PhysicalServer | | ... |

| src CI ID | dst CI ID | RELATIONSHIP ID |
|---|---|---|
| SVR0001 | SERVICE003 | REL0001 |
| SVR0001 | PSVR004 | REL0002 |

2300

P1 — (row 1)
P2 — (row 2)

| RULE ID | src CI TYPE | dst CI TYPE | src AND dst RELATIONSHIP | RELEVANT ASSOCIATION CLASS |
|---|---|---|---|---|
| 01 | PhysicalServer | Server | execute(src, dst) | DEPENDENCY CLASS |
| 02 | Server | PhysicalServer | execute(src, dst) | IMPACT CLASS |
| 03 | Server | Server | request(src, dst) | p-c CLASS |
| 04 | Server | Service | request(src, dst) | p-c CLASS |

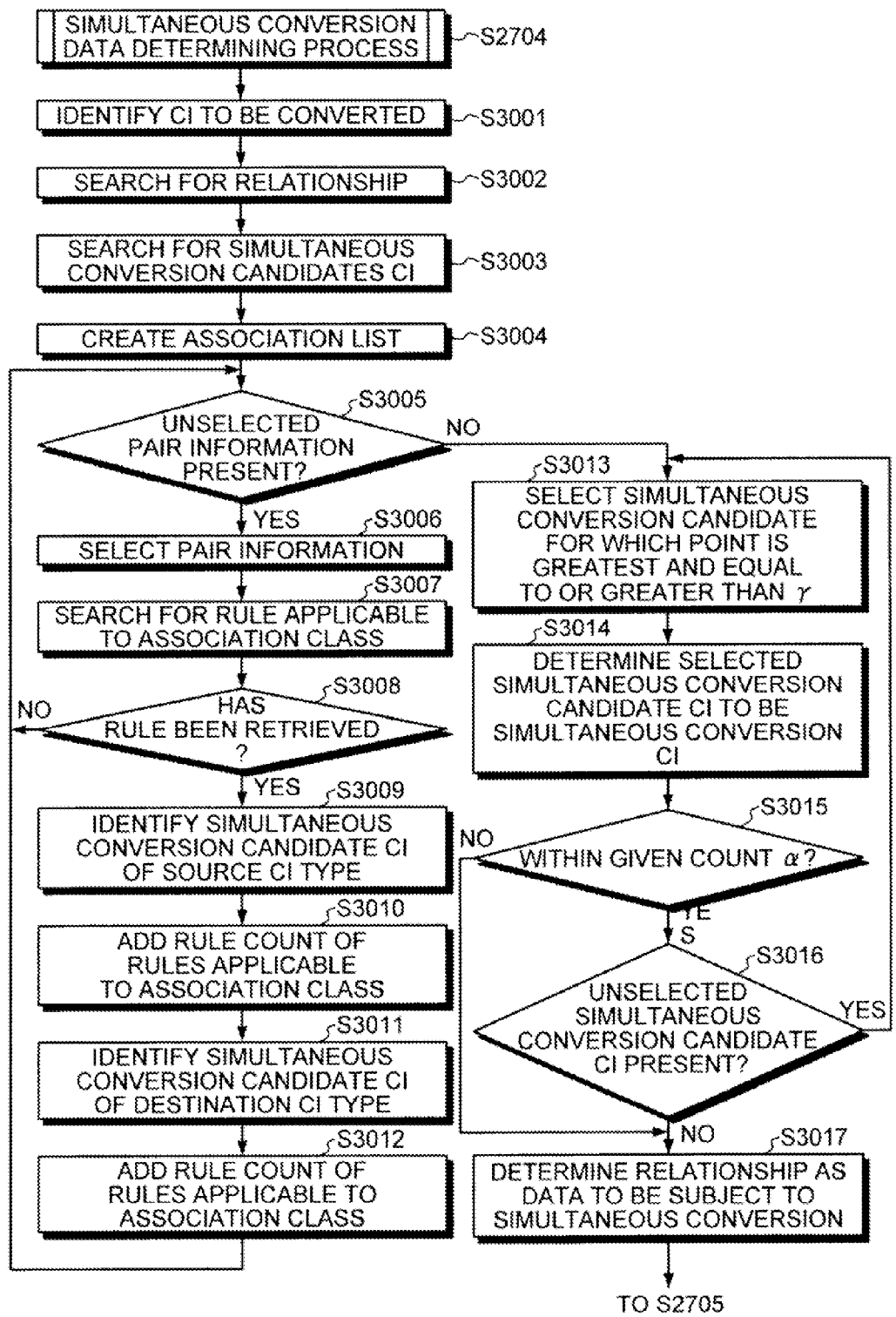

COMPUTER PRODUCT, DATA CONVERSION APPARATUS, AND CONVERSION METHOD

CROSS REFERENCE TO RELATED APPLICATIONS

This application is based upon and claims the benefit of priority of the prior Japanese Patent Application No. 2010-282301, filed on Dec. 17, 2010, the entire contents of which are incorporated herein by reference.

FIELD

The embodiments discussed herein are related to data conversion.

BACKGROUND

Consequent to a change in or the introduction of a new information technology system management method, the schema of a configuration management database (CMDB) may change.

Here, a schema is an outline representing data configuration and type. A CMDB is a database recording data related to associations between configuration items (CI), such as IT system configuration items. A CI is a resource that is subject to configuration management, such as, for example, hardware, software, documents, services, assets, etc.

When the CMDB schema changes, the format of data related to the CIs in the CMDB and to the associations (relationships) between the CIs changes corresponding to the schema change. For example, if a server in the system is managed by adding a name easily recognized by a person, in addition to the host name automatically created systematically, the CMDB schema changes.

In this case, corresponding to the CMDB schema change, for example, if the format of data related to the server in the CMDB is not converted, the host name cannot be described as the new name. Therefore, when the CMDB schema changes, the formats of data related to CIs in the CMDB and relationships thereof are converted according to the change. For examples of prior technologies related to data conversion, refer to Japanese Laid-Open Patent Publication Nos. 2006-79277, 2003-248675, H3-81841, 2005-78237, and 2006-293796; Japanese National Re-publication of International Patent Application No. 2005-086003; and Japanese Patent No. 4242056.

Nonetheless, with the conventional technologies, when the CMDB schema changes, the formats of the data related to the CIs in the CMDB and the associations thereof are converted collectively. Consequently, a problem arises in that the processing time consumed to convert the data increases. Further, during the data conversion, data recording, searches, updating, etc. cannot be performed with respect to the CMDB. Consequently, accompanying the increase in the time consumed for data conversion in the conventional technologies, a further problem arises in that the duration of service suspension increases.

SUMMARY

According to an aspect of an embodiment, a computer-readable medium stores therein a data conversion program that causes a computer to execute a process that includes receiving after a schema of a database has been changed from a former schema to a new schema, a processing request concerning the database; judging based on difference information concerning the former schema and the new schema, whether in the processing request, a condition that specifies process data subject to processing, has been changed by the new schema; searching the database for conversion data whose format is to be converted from the former schema to the new schema, the searching based on judgment results obtained at the judging and on the processing request; and converting the format of the retrieved conversion data, from the former schema to the new schema.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram of an example of a schema change table.

FIG. 8 is a diagram of a search results table.

FIG. 17 is a diagram of an example of a simultaneous conversion candidate CI list.

FIG. 18 is a diagram of an example of a CI type list.

FIG. 19 is a diagram of an example of a statistical table.

FIG. 22 is a diagram of another example of a simultaneous conversion candidate CI list.

FIG. 23 is a diagram of an example of an association list.

FIG. 30 is a flowchart of another example of the simultaneous conversion determining process at step S2704.

DESCRIPTION OF EMBODIMENTS

Preferred embodiments of the present invention will be explained with reference to the accompanying drawings.

Figure 1:
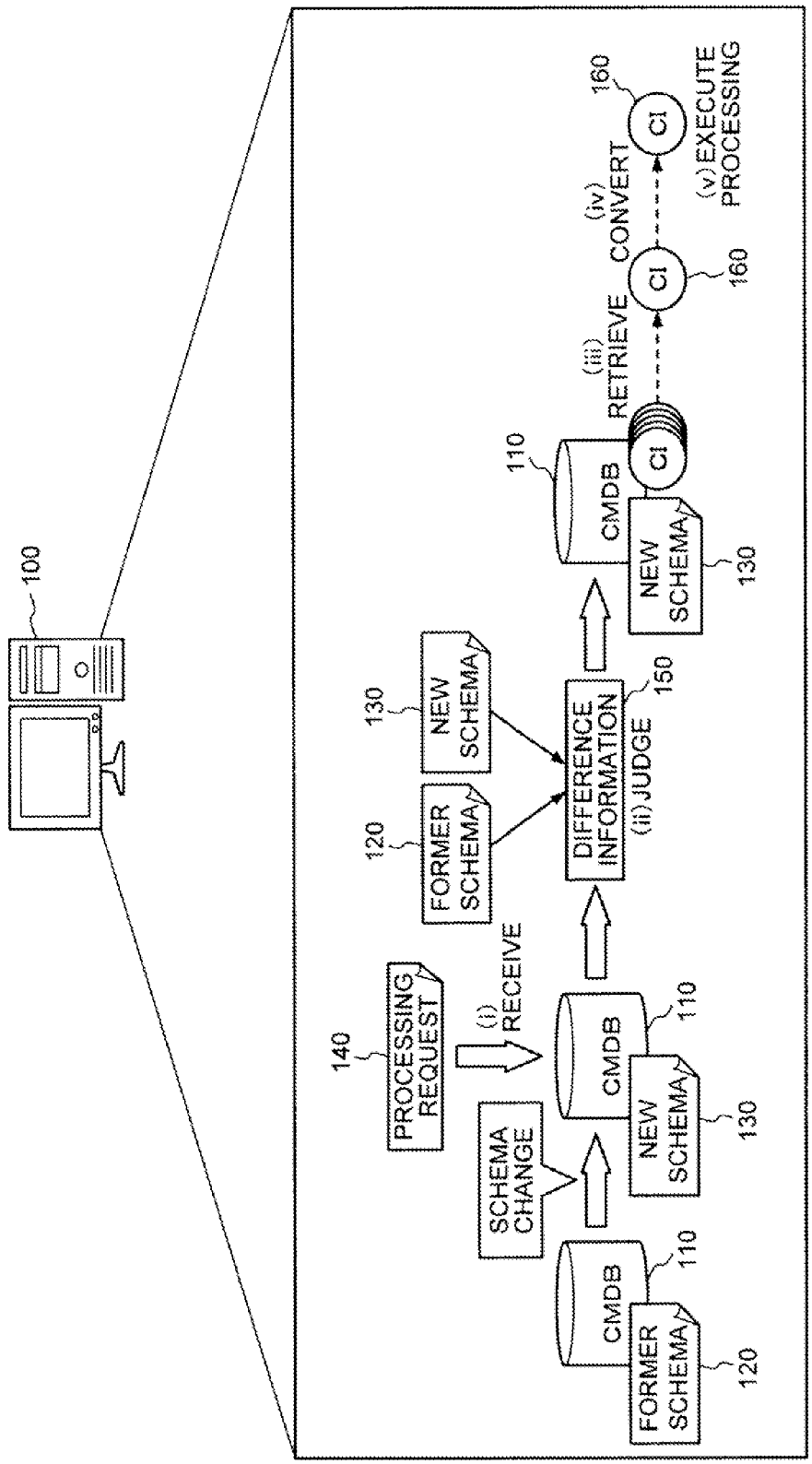
FIG. 1 is a diagram of an example of implementation of a data conversion process according to an embodiment.

FIG. 1 is a diagram of an example of implementation of a data conversion process according to an embodiment. In FIG. 1, a data conversion apparatus 100 includes a CMDB 110 and is a computer that has a function of converting the format of data in the CMDB 110, according to a change in the schema of the CMDB 110.

Here, the CMDB 110 is a database that records data related to IT system CIs and relationships between the CIs. A CI, for example, may be hardware, software, documents, services, assets, etc. configuring the IT system. The schema of the CMDB 110 is an outline representing the configuration and type of data related to the CIs in the CMDB 110 and the relationships between the CIs.

The data conversion apparatus 100 has a function of processing a processing request concerning the CMDB 110. A processing request concerning the CMDB 110 is, for example, a request for the retrieval, the deletion, the updating (registration), etc. of data in the CMDB 110.

In the present embodiment, the data conversion apparatus 100, triggered by a processing request after a change in the schema of the CMDB 110, successively converts the format of the data to be processed to cause the format of the data in the CMDB 110 to transition stepwise to the latest schema. Here, an example of a procedure of the data conversion process by the data conversion apparatus 100 will be described.

(i) The data conversion apparatus 100 receives a processing request 140 concerning the CMDB 110, after the schema of the CMDB 110 has changed from a former schema 120 to a new schema 130. Here, the target of the CMDB 110 schema change is, for example, a change, addition, deletion, etc. of an attribute or an element representing a characteristic of data in the CMDB 110.

(ii) The data conversion apparatus 100, based on difference information 150 concerning the former schema 120 and the new schema 130, judges whether the condition specifying the data to be subject to the process requested by the processing request 140 has been changed by the new schema 130. The condition specifying the data to be subject to the process specifies, for example, the CI name, the relationship name, element name, and/or attribute name of the data in the CMDB 110.

Here, if the process requested by the processing request 140 is a process according to a new schema, the data conversion apparatus 100 may be unable to perform the process if the format of the data to be processed has not been converted to the new schema. In other words, when the condition specifying the data to be processed has been changed by a new schema, the CMDB 110 schema change may affect the requested process.

Thus, the data conversion apparatus 100 judges whether the condition specifying the data to be processed has been changed by a new schema and thereby judges whether the CMDB 110 schema change will affect the requested process.

(iii) The data conversion apparatus 100, based on the judgment results and the processing request 140, retrieves from the CMDB 110, data whose format is to be converted from the former schema 120 to the new schema 130.

For example, if the condition specifying the data to be processed has not been changed by the new schema 130, the CMDB 110 schema change will not affect the requested process. Therefore, the data conversion apparatus 100 retrieves, from the CMDB 110, data 160 that meets the condition. In other words, since the CMDB 110 schema change will not affect the process, the search is performed using the condition as is.

On the other hand, if the condition specifying the data to be processed has been changed by the new schema 130, the CMDB 110 schema change may affect the requested process. Therefore, the data conversion apparatus 100 replaces the condition with a condition that corresponds to the former schema 120 and retrieves from the CMDB 110, the data 160 that meets the condition corresponding to the former schema. In other words, since the CMDB 110 schema change affects the requested process, the search is performed using another condition that corresponds to the former schema 120 so that the process is not affected.

(iv) The data conversion apparatus 100 converts the format of the retrieved data 160, from the former schema 120 to the new schema 130. For example, the data conversion apparatus 100, according to the new schema 130 of the CMDB 110, changes, adds, deletes, etc. the attribute and/or element of the data 160.

(v) The data conversion apparatus 100 executes the process requested by the processing request 140. For example, if the processing request 140 is search request, the data conversion apparatus 100 returns to the source of the processing request 140, the data 160 whose format has been converted.

If the processing request 140 is an update request, the data conversion apparatus 100 performs an updating process on the data 160 whose format has been converted. However, configuration may be such that if the processing request 140 is a deletion request, the data conversion apparatus 100 deletes the data 160 without converting the format.

As described, according to the data conversion apparatus 100, when a processing request is received, the format of the data to be processed can be successively converted according to the CMDB 110 schema change, whereby the format of the data in the CMDB 110 can be converted stepwise to the new schema 130.

Although in the description the data conversion apparatus 100 includes the CMDB 110, configuration is not limited hereto. For example, the CMDB 110 may be provided in another computer that can be accessed by the data conversion apparatus 100.

Figure 2:
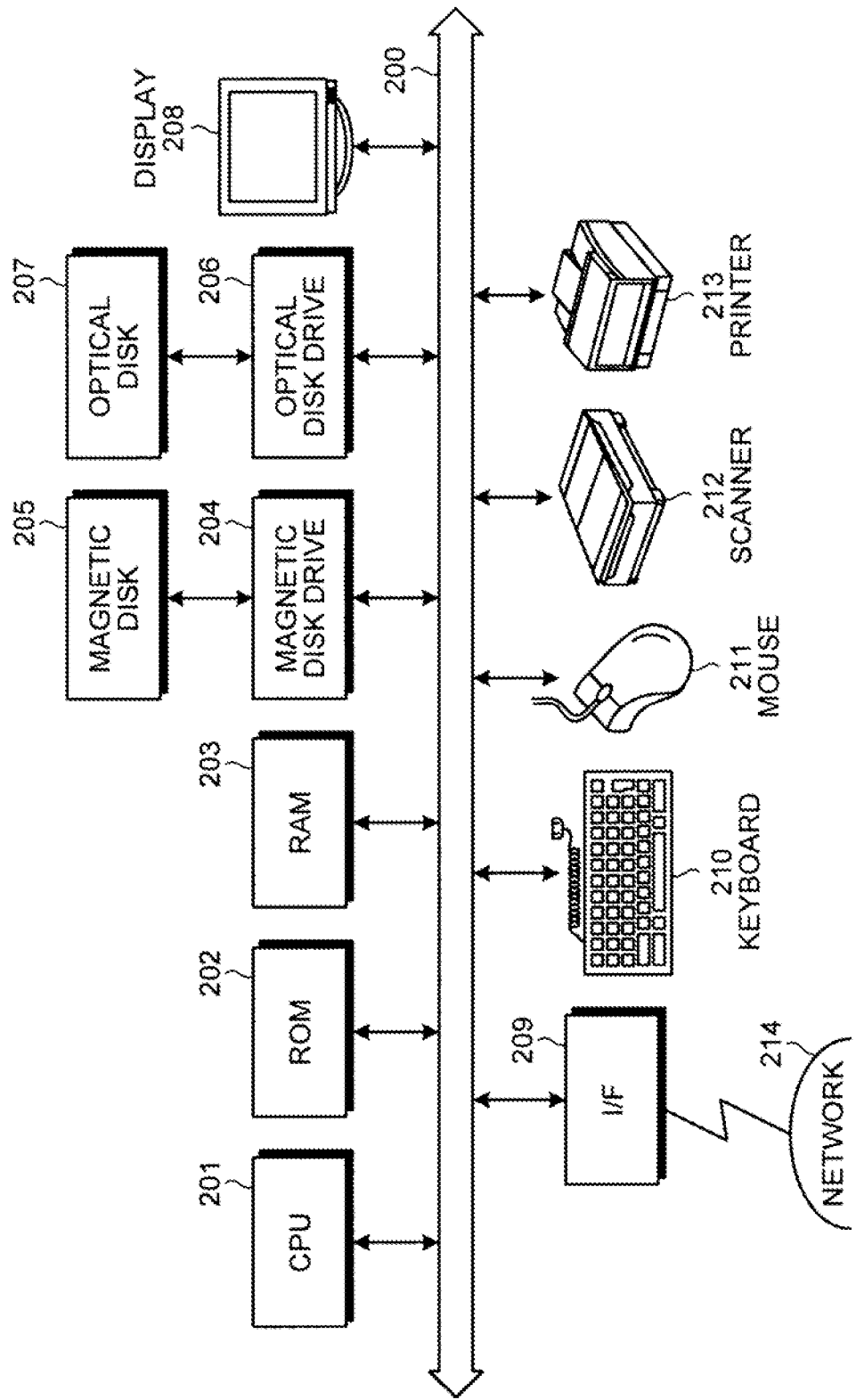
FIG. 2 is a block diagram of a hardware configuration of a data conversion apparatus according to the embodiment.

FIG. 2 is a block diagram of a hardware configuration of the data conversion apparatus according to the embodiment. In FIG. 2, the data conversion apparatus 100 includes a central processing unit (CPU) 201, a read-only memory (ROM) 202, a random access memory (RAM) 203, a magnetic disk drive 204, a magnetic disk 205, an optical disk drive 206, an optical disk 207, a display 208, an interface (I/F) 209, a keyboard 210, a mouse 211, a scanner 212, and a printer 213, respectively connected by a bus 200.

The CPU 201 governs overall control of the design support apparatus. The ROM 202 stores therein programs such as a boot program. The RAM 203 is used as a work area of the CPU 201. The magnetic disk drive 204, under the control of the CPU 201, controls the reading and writing of data with respect to the magnetic disk 205. The magnetic disk 205 stores therein data written under control of the magnetic disk drive 204.

The optical disk drive 206, under the control of the CPU 201, controls the reading and writing of data with respect to the optical disk 207. The optical disk 207 stores therein data written under control of the optical disk drive 206, the data being read by a computer.

The display 208 displays, for example, data such as text, images, functional information, etc., in addition to a cursor, icons, and/or tool boxes. A cathode ray tube (CRT), a thin-film-transistor (TFT) liquid crystal display, a plasma display, etc., may be employed as the display 208.

The I/F 209 is connected to a network 214 such as a local area network (LAN), a wide area network (WAN), and the Internet through a communication line and is connected to other computers through the network 214. The I/F 209 administers an internal interface with the network 214 and controls the input/output of data from/to external apparatuses. For example, a modem or a LAN adaptor may be employed as the I/F 209.

The keyboard 210 includes, for example, keys for inputting letters, numerals, and various instructions and performs the input of data. Alternatively, a touch-panel-type input pad or numeric keypad, etc. may be adopted. The mouse 211 is used to move the cursor, select a region, or move and change the size of windows. A track ball or a joy stick may be adopted provided each respectively has a function similar to a pointing device.

The scanner 212 optically reads an image and takes in the image data into the data conversion apparatus. The scanner 212 may have an optical character reader (OCR) function as well. The printer 213 prints image data and text data. The printer 213 may be, for example, a laser printer or an ink jet printer.

Figure 3:
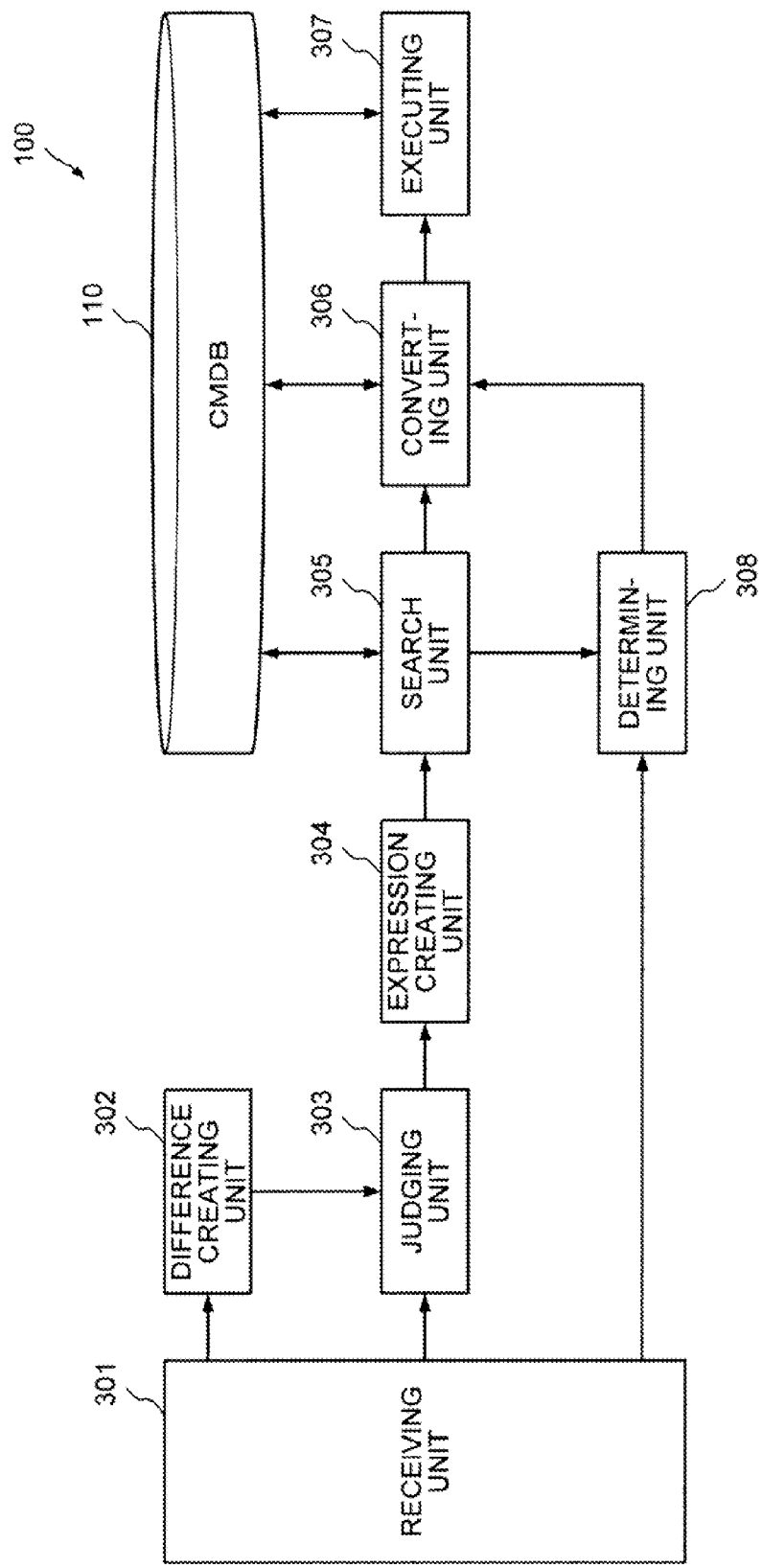
FIG. 3 is a block diagram of a functional configuration of the data conversion apparatus.

FIG. 3 is a block diagram of a functional configuration of the data conversion apparatus according to the embodiment. In FIG. 3, the data conversion apparatus 100 includes the CMDB 110, a receiving unit 301, a difference creating unit 302, a judging unit 303, an expression creating unit 304, a search unit 305, a converting unit 306, an executing unit 307, and a determining unit 308. Functions of the receiving unit 301 to the determining unit 308 are, for example, implemented by the I/F 209 or by executing on the CPU 201, a program stored in a storage device such as the ROM 202, the RAM 203, the magnetic disk 205, and the optical disk 207 depicted in FIG. 2. Processing results obtained by the functional units are stored to a storage device such as the RAM 203, the magnetic disk 205, and the optical disk 207.

The receiving unit 301 receives registration of the schema of the CMDB 110. For example, the receiving unit 301 receives registration of the schema by input via user operation of the keyboard 210 and/or the mouse 211 depicted in FIG. 2. The receiving unit 301 may further receive the schema via the network 214, from an external computer.

The language describing the schema may be, for example, Document Type Definition (DTD), XML Schema, RELAX NG. Here, an example will be described where XML is used to describe the schema of the CMDB 110.

Figure 4:
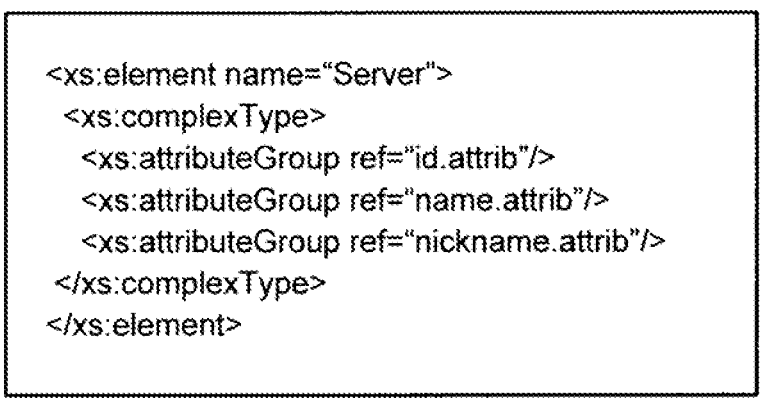
FIG. 4 is a diagram of an example of a schema.

FIG. 4 is a diagram of an example of a schema. In FIG. 4, a schema 400 defines attributes of the data of a CI named "Server", in the CMDB 110. For example, in the schema 400, "id", "name", and "nickname" are defined as attributes of "Server".

"id" is an identifier of "Server". "name" is the name of "Server". "nickname" is a nickname of "Server". The received schema is registered as the new schema of the CMDB 110. In other words, each time registration of a schema of the CMDB 110 is received, the schema of the CMDB 110 is changed from the former schema to the new schema.

In returning to the description of FIG. 3, the difference creating unit 302 creates difference information that indicates the difference between the former schema and the new schema of the CMDB 110. Here, difference information is, for example, information that indicates in which schema version, the element name/the attribute name of a CI has been changed, added, or deleted. The difference information is created each time a new schema of the CMDB 110 is registered.

For example, the difference creating unit 302 reads out from a storage device such as the magnetic disk 205 and the optical disk 207, a registered new schema and the former schema for the same CI, and creates difference information indicating the difference between the former schema and the new schema. The created difference information is, for example, stored to a schema change table 500 depicted in FIG. 5. Here, an example of the schema change table 500 will be described.

FIG. 5 is a diagram of an example of a schema change table. In FIG. 5, the schema change table 500 has a CI "Name/Type" field, a "Child Element/Attribute" field, and a "Version" field. By entering information into the fields, the difference information indicating the difference between the former schema and the new schema is stored as records 500-1 to 500-6.

The CI Name/Type field indicates the name/type of the CI. The Child Element/Attribute field indicates the CI element/attribute. The Version field indicates the version number of the CMDB 110 schema in which the CI element/attribute has been added or deleted. In FIG. 5, "null" indicates that the CI element/attribute has been deleted.

Taking record 500-1 as an example, the record indicates that the element/attribute "@pname" of the CI "Server" has been deleted. Record 500-2 indicates that in version number "2" of the schema, the element/attribute "@nickname" of the CI "Server" is defined. Record 500-6 indicates that in version number "1" of the schema, the element/attribute "@name" of the CI "Service" is defined.

In returning to the description of FIG. 3, the receiving unit 301 receives a processing request concerning the CMDB 110. A processing request concerning the CMDB 110 is, for example a request for the retrieval, the deletion, the updating (registration), etc. of data in the CMDB 110. The data in the CMDB 110 is data related to the CIs (hereinafter, simply "CI") and data related to relationships (hereinafter, simply "relationship"). The relationship includes IDs identifying two associated CIs.

The data configuration of a processing request is, for example, as follows.
  search request: query(String query_string)
  deletion request: delete (String query_string)
  update request: update (Node ci_data)

For example, the receiving unit 301 receives a processing request concerning the CMDB 110 by input via user operation of the keyboard 210 and/or the mouse 211. The receiving unit 301 may further receive the processing request via the network 214, from an external computer. Here, an example will be described where the processing request is expressed using notation of an expanded XML path language (XPath).

Figure 6:
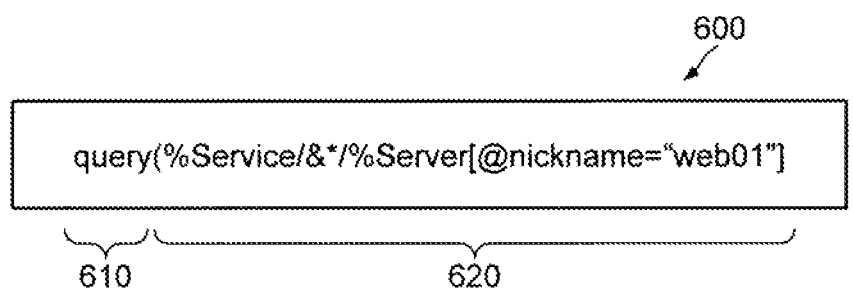
FIG. 6 is a diagram of an example of a processing request.

FIG. 6 is a diagram of an example of a processing request. In FIG. 6, a processing request 600 includes a character string 610 and a character string 620. The character string 610 is a character string that indicates the contents of the process requested by the processing request 600. In the example of the processing request 600, the character string 610 is "query" and therefore, process contents of the processing request 600 are for a search process.

The character string 620 is a character string that indicates a condition in the processing request 600 and specifies the data to be processed. The condition specifying the data to be processed, for example, can specify a CI name, a relationship name, an element name, and an attribute name. If multiple conditions specify the data to be processed, each condition is separated by a "/" and is described in the character string 620.

Here, "%" included in the processing request 600 is a symbol indicating a CI name, "&" is a symbol indicating a relationship name, and "@" is a symbol indicating an element name or an attribute name. In other words, if "%" is given for a name, the name is of a CI; if "&" is given for a name, the name is of a relationship; and if "@" is given for a name, the name is of an element or an attribute. "*" given for a name is a wildcard. For example, the processing request 600 is a search request to search for a CI of the CI name "Server" connected, by a relationship, to a CI of the CI name "Service", with an attribute "nickname" of "web01".

In returning to the description of FIG. 3, the judging unit 303, based on the created difference information, judges whether the condition in the received processing request and specifying the data to be processed has been changed by the new schema.

As described, the condition specifying the data to be processed, for example, can specify a CI name, a relationship name, an element name, and an attribute name. Here, the judging unit 303 judges whether the condition specifying the data to be processed is a CI element or attribute that has been newly added or deleted by the new schema.

For example, based on the character string representing the condition specifying the data that is to be processed and included in the processing request, the judging unit 303 creates a conditional clause specifying the data. For example, when the processing request is search request or a deletion request, the judging unit 303 extracts from the processing request, a character string that represent the condition and creates a conditional clause. In other words, when the processing request is a search request or a deletion request, the character string representing the condition becomes the conditional clause. In the processing request 600 example depicted in FIG. 6, the character string 620 becomes the conditional clause specifying the data to be processed.

The created conditional clause may include multiple sub-conditional clauses. Sub-conditional clauses, for example, are separated by a "/". In the processing request 600 example, the conditional clause (the character string 620) includes the sub-conditional clauses "% Service", "&*" and "% Server [@nickname="web01"]", respectively separated by a "/".

In this case, the judging unit 303 separates the conditional clause into the multiple sub-conditional clauses separated by a "/". In the processing request 600 example, the conditional clause specifying the data to be processed is separated, creating three sub-conditional clauses "% Service", "&*", and "% Server[@nickname="web01"]".

When the processing request is an update request, based on the character string representing the condition specifying the data that is to be processed and included in the processing request, the judging unit 303 creates a conditional clause specifying the data. For example, assuming that the processing request is "update (Server id="xxx" name="yyy")", in this case, based on the character string "Server id="xxx"", for example, the judging unit 303 creates the conditional clause "% Server[@id="xxx"]".

From the schema change table 500 depicted in FIG. 5, the judging unit 303 retrieves the difference information in which the element name or the attribute name of the CI included in the created conditional clause is set. When the conditional clause specifying the data to be processed includes multiple sub-conditional clauses, the judging unit 303 retrieves difference information for each of the sub-conditional clauses.

For example, assuming that, for example, the conditional clause is "% Server[@id="xxx"]", in this case, the judging unit 303 retrieves from the schema change table 500, record 500-5 in which "% Server" is set in the "CI Name/Type" field and "@id" is set in the "Child Element/Attribute" field.

Assuming that, for example, the conditional clause is "% Server[nickname="web01"]", in this case, the judging unit 303 retrieves from the schema change table 500, record 500-2 in which "% Server" is set in the "CI Name/Type" field and "@nickname" is set in the "Child Element/Attribute" field.

Concerning the CI included in the conditional clause, the judging unit 303 judges whether the version number of the retrieved difference information indicates the oldest version number among the version numbers of the registered schema. For each CI, the oldest version number of registered schema is, for example, the oldest version number among the version numbers of the schema having data in the CMDB 110. Further, the oldest version number may be, for example, stored to a storage device such as the ROM 202, the RAM 203, the magnetic disk 205, and the optical disk 207.

For example, assuming that for the CI of the CI name "% Server", the oldest version number of the registered schema is "1" and that the retrieved difference information is "record 500-5", in this case, the judging unit 303 judges that the version number "1" indicated in record 500-5 is the oldest version number. Assuming the retrieved difference information is "record 500-2", in this case, the judging unit 303 judges that the version number "2" indicated in record 500-2 is not the oldest version number.

Here, if the version number of the retrieved difference information is the oldest version number, the condition specifying the data to be processed has not been changed by the new schema. Therefore, if the version number of the difference information is the oldest version number, the judging unit 303 judges that the condition in the processing request and specifying the data to be processed has not been changed by the new schema.

On the other hand, if the version number of the difference information is not the oldest version number, the condition specifying the data to be processed has been changed by the new schema (at least by a schema more recent than the oldest schema). Consequently, if the version number of the difference information is not the oldest version number, the judging unit 303 judges that the condition in the processing request and specifying the data to be processed has been changed by a new schema.

If there are multiple sub-conditional clauses specifying the data to be processed, the judging unit 303 judges for each sub-conditional clause, whether the condition (sub-conditional clause) specifying the data to be processed has been changed by the new schema.

If the element name of the attribute name of the CI is not included in the conditional clause, the judging unit 303 judges that the condition specifying the data to be processed has not been changed by the new schema. For example, if the conditional clause is "% Service", neither the element name nor the attribute name of the CI is indicated by "@". Consequently, when the conditional clause is "% Service", the judging unit 303 judges that the condition specifying the data to be processed has not been changed by the new schema.

If the created conditional clause includes a relationship name, the judging unit 303 judges that the condition specifying the data to be processed has not been changed by the new schema. For example, if the conditional clause is "&*", the judging unit 303 judges that the condition specifying the data to be processed has not been changed by the new schema.

If one conditional clause includes multiple sub-conditional clauses connected by "and", the judging unit 303 separates the sub-conditional clauses connected by "and", and further creates smaller conditional clauses. The judging unit 303 judges for each of the resulting smaller conditional clauses, whether the condition specifying the data to be processed (the resulting smaller conditional clause) has been changed by the new schema.

For example, a conditional clause "% Server[@id="aaa" and@name="bbb"]" is formed by multiple sub-conditional clauses connected by "and". In this case, the multiple sub-conditional clauses connected by "and" are separated and two conditional clauses "% Server[@id="aaa"]" and "% Server[@name="bbb"] " are created.

If the created conditional clause is not connected by only "and", the judging unit 303 judges that the condition specifying the data to be processed has been changed by the new schema. For example, a conditional clause "% Server[@id="aaa" or@name="bbb"]" is not connected by only "and". In this case, the judging unit 303 judges that the condition specifying the data to be processed has been changed by the new schema.

Here, a conditional clause in which only one condition is described, such as "% Server[@id="aaa"]" is regarded as a conditional clause connected by only "and". In other words, the judging unit 303 regards a conditional clause that describes a single condition as a conditional clause connected by only "and".

The expression creating unit 304, based on the judgment results and the received processing request, retrieves from the CMDB 110, the data whose format is to be converted from the former schema to the new schema.

In the description below, "judgment result (a)" indicates judgment that the condition specifying the data to be processed has not been changed by the new schema. Further, "judgment result (b)" indicates judgment that the condition specifying the data to be processed has been changed by the new schema.

In the case of judgment result (a), the expression creating unit 304, based on the character string included in the processing request and representing the condition specifying the data to be processed, creates a search expression for retrieving the data to be converted. For example, the expression creating unit 304 creates a conditional clause specifying the data that is to be processed and included in the processing request.

For example, assuming that for the conditional clause "% Server[@id="xxx"]", the judgment result is judgment result (a), in this case, the expression creating unit 304 regards the conditional clause "% Server[@id="xxx"]" as the search expression for retrieving the data to be converted. In other words, the expression creating unit 304 creates a search expression to retrieve (as the data to be converted) the data to be processed.

In the case of judgment result (b), the expression creating unit 304 creates a search expression for retrieving the data to be converted by converting the condition specifying the data that is to be processed and included in processing request, to a condition corresponding to the former schema. For example, the expression creating unit 304 refers to a version-element correspondence table 700 (depicted in FIG. 7) and converts the conditional clause specifying the data to be processed, to a conditional clause corresponding to the former schema, thereby creating a search expression for retrieving the data to be converted.

The version-element correspondence table 700, for example, is received by the receiving unit 301 by input via user operation of the keyboard 210 and/or the mouse 211. Furthermore, the version-element correspondence table 700 may be created by user operation of the keyboard 210 and/or the mouse 211 to set the element names and the attributes name of the CIs having correspondence relationships between versions of the schema of the CMDB 110.

CIs having a correspondence relationship between versions, for example, are CIs having the same name between versions and set as the initial the CI name; CIs for which the meaning represented by the attribute (for example, name and nickname) is similar between versions. Here, an example of the version-element correspondence table 700 will be described.

Figure 7:
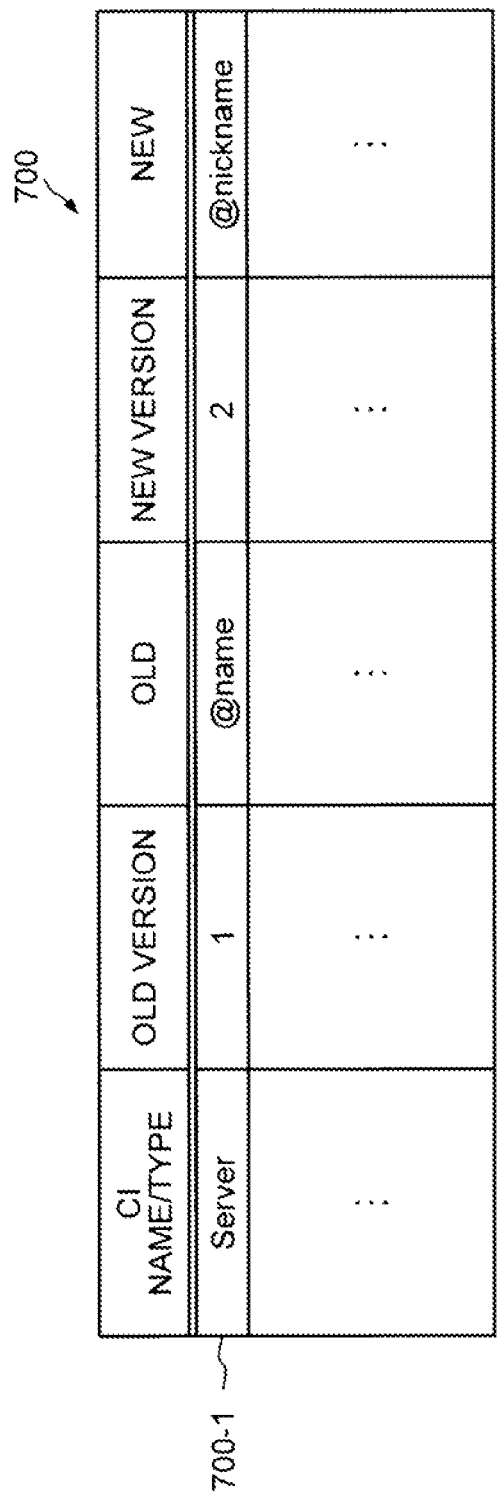
FIG. 7 is a diagram of an example of a version-element correspondence table.

FIG. 7 is a diagram of an example of a version-element correspondence table. In FIG. 7, the version-element correspondence table 700 has a "CI Name/Type" field, an "old version" field, an "old" field, a "new version" field, and a "new" field. By entering data into the fields, version-element correspondence information is stored as records (e.g., record 700-1).

The CI Name/Type field indicates the name/type of the CI. The old version field indicates the version number of the former schema. The old field indicates the CI element/attribute of the former schema. The new version field indicates the version of the new schema. The new field indicates the CI element/attribute of the new schema.

Record 700-1 indicates correspondence a relationship between the attribute "@name" of the CI "Server" defined by the former schema of version number "1" and the attribute "@nickname" of the CI "Server" defined by the new schema of version number "2".

Here, assuming that version number of the former schema is "1", the version number of the new schema is "2", and a conditional clause for which judgment result (b) has been determined is "% Server[@nickname="web01"]", in this case, the expression creating unit 304 searches the version-element correspondence table 700 for version-element correspondence information that satisfies the following conditions (I) to (IV).

(I) The "CI Name/Type" field indicates the CI name "Server" included in the conditional clause for which judgment result (b) has been determined.

(II) The "old version" field indicates version number "1" of former schema.

(III) The "new version" field indicates version number "2" of the new schema.

(IV) The new field indicates the attribute "@nickname" included in the conditional clause for which judgment result (b) has been determined.

Here, record 700-1, which satisfies conditions (I) to (IV) above, is retrieved from the version-element correspondence table 700. Next, the expression creating unit 304 converts the attribute name "@nickname" included in the conditional clause to the attribute name "@name" indicated in the "old" field of record 700-1.

The expression creating unit 304 regards the converted conditional clause "% Server[@name="web01"]" as a search expression for retrieving the data to be converted and thereby converts the condition specifying the data to be processed to a condition that corresponds to the former schema to be able to create a search expression for retrieving the data to be converted.

Nonetheless, for example, version-element correspondence information that satisfies conditions (I) (IV) may not be retrieved from the version-element correspondence table 700. In other words, the element name and the attribute name of the CI of the former schema and having a correspondence relationship with the CI of the new schema may not exist. In this case, as described below, the expression creating unit 304 may create a search expression for retrieving a subset that includes all of the data to be processed.

For example, in the case of judgment result (b), the expression creating unit 304, based on a character string that represents a condition specifying the subset that includes all of the data to be processed, may create a search expression for retrieving the data to be converted. The subset is a data aggregate that includes all of the data to be processed among the data in the CMDB 110.

For example, when hierarchized conditions are specified as the condition specifying the data to be processed, the expression creating unit 304 creates a search expression for retrieving the data to be converted, based on a character string that represents the highest level condition, among the hierarchized conditions.

For example, assuming that the conditional clause for which judgment result (b) has been determined is "% Server [@nickname="web01"]", in this case, the conditional clause specifying the subset that includes all of the data to be processed is "% Server". Consequently, the expression creating unit 304 creates the conditional clause "% Server" as a search expression for retrieving the data to be converted. In other words, the expression creating unit 304 extracts the highest level condition from the hierarchally described conditional clause and creates a search expression for retrieving the data to be converted.

For example, among the hierarchized conditions "CI name, element name, attribute name" specifying the data to be processed, the expression creating unit 304 creates, as a search expression for retrieving the data to be converted, a conditional clause specifying the highest level condition "CI name". Consequently, the expression creating unit 304 can create a search expression for retrieving a subset that includes all of the data to be processed.

A second CI may exist that is associated with the CI (herein, "first CI") specified by a conditional clause for which judgment result (b) has been determined. In this case, the expression creating unit 304 may create, as a search expression for retrieving the data to be converted, a conditional clause that includes the first CI, the second CI, and the relationship of the first and the second CIs.

For example, in the processing request 600 example, three sub-conditional clauses "% Server[@nickname="web01"]", "% Service", and "&*" are created. Here, the conditional clause for which judgment result (b) has been determined, is assumed to be "% Server[@nickname="web01"]".

In this example, a second CI "% Service" exists that is associated with the first CI "% Server" specified by the conditional clause for which judgment result (b) has been determined. In this case, the expression creating unit 304 creates, as a search expression for retrieving the data to be converted, the conditional clause "% Service/&*/% Server", which includes the first CI "% Server", the relationship "&*", and the second CI "% Service".

Consequently, compared to a case where the highest level condition "% Server" of the conditional clause alone is regarded as the search expression, the subset, which includes all of the data to be processed, can be narrowed down, enabling suppression of the number of data that are to be subject to format conversion.

The search unit 305 uses the created search expression to search the CMDB 110 for data that is to be converted. For example, assuming that the search expression is "% Server [@name="web01"]", in this case, the search unit 305 searches the CMDB 110 for a CI for which the CI name is "Server" and the attribute "@name" is "web01".

Further, for example, assuming that the search expression is "% Service/&*/% Server", in this case, the search unit 305 searches the CMDB 110 for a CI for which the attribute "@name" is "web01", the CI name is "Server" and that is connected by a relationship to a CI for which the CI name is "Service".

Figure 8:
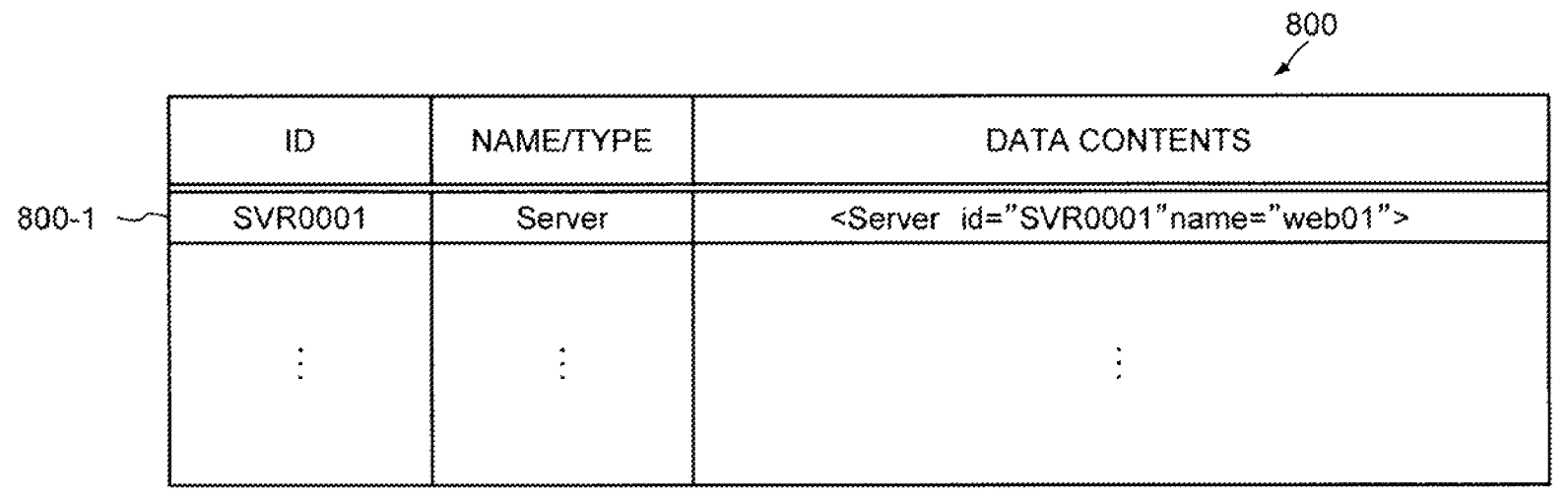

The retrieved search results are, for example, stored to a search results table 800 (depicted in FIG. 8). The search results table 800, for example, is implemented by a storage device such as the RAM 203, the magnetic disk 205, and the optical disk 207. Here, an example of the search results table 800 will be described.

FIG. 8 is a diagram of a search results table. In FIG. 8, the search results table 800 has an "ID" field, a "Name/Type" field, and a "Data Contents" field. By entering information into the fields, the retrieved search results can be stored as records (e.g., record 800-1).

The ID field indicates a CI or relationship identifier. The Name/Type field indicates a CI or relationship name/type. The Data Contents field indicates the CI or relationship contents. Record 800-1 indicates a CI having an ID "SVR0001", a Name/Type "Server", and data contents "<Server id="SVR0001"name="web01">".

In returning to the description of FIG. 3, the converting unit 306 converts the format of retrieved data, from the former schema to the new schema. For example, the converting unit 306, based on a data conversion rule 900 (depicted in FIG. 9), converts the format of data in the search results table 800 depicted in FIG. 8, from the former schema to the new schema.

The data conversion rule 900, for example, is input via user operation of the keyboard 210 and/or the mouse 211 and the new schema of the CMDB 110 is also input. Here, an example will be described in which the data conversion rule 900 is described using XML Stylesheet Language Transformations (XSLT).

Figure 9:
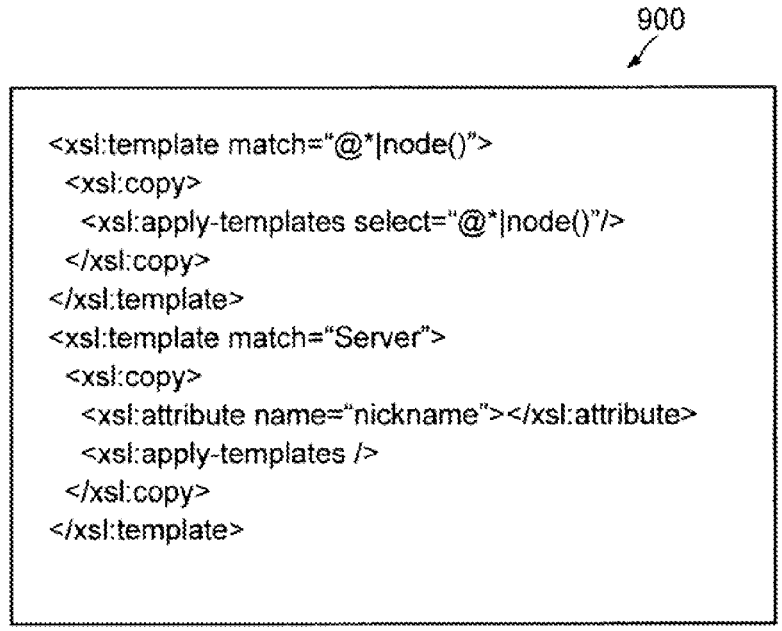
FIG. 9 is a diagram of an example of a data conversion rule.

FIG. 9 is a diagram of an example of a data conversion rule. In FIG. 9, the data conversion rule 900 is a data conversion rule for converting the data format of the CI of the CI name "Server", from the former schema to the new schema. For example, the data conversion rule 900 is the result of adding the attribute "nickname" to the data format of the CI of the CI name "Server".

For example, with each CMDB 110 schema change, the data conversion rule is input to the data conversion apparatus 100 together with the new schema. Consequently, a data conversion rule exists for each version from version number "2" and thereafter. Here, an example is assumed where the data format of a given CI is converted from version number "1" of the former schema to version number "3" of the new schema.

In this case, based on the version number "2" data conversion rule, the converting unit 306 converts the data format of the CI from the version number "1" schema to the version number "2" schema. Thereafter, based on the version number "3" data conversion rule, the converting unit 306 converts the data format of the CI from the version number "2" schema to the version number "3" schema.

The results of the conversion are reflected to the CMDB 110. In other words, the data for which the format has been converted from the former schema to the new schema is stored to the CMDB 110. If the format of data in the CMDB 110 has been converted, for example, the version number of the schema after conversion is stored as meta information to a meta information table 1000 (depicted in FIG. 10). The meta information table 1000, for example, is implemented by a storage device such as the RAM 203, the magnetic disk 205, and the optical disk 207. Here, an example of the meta information table 1000 will be described.

Figure 10:
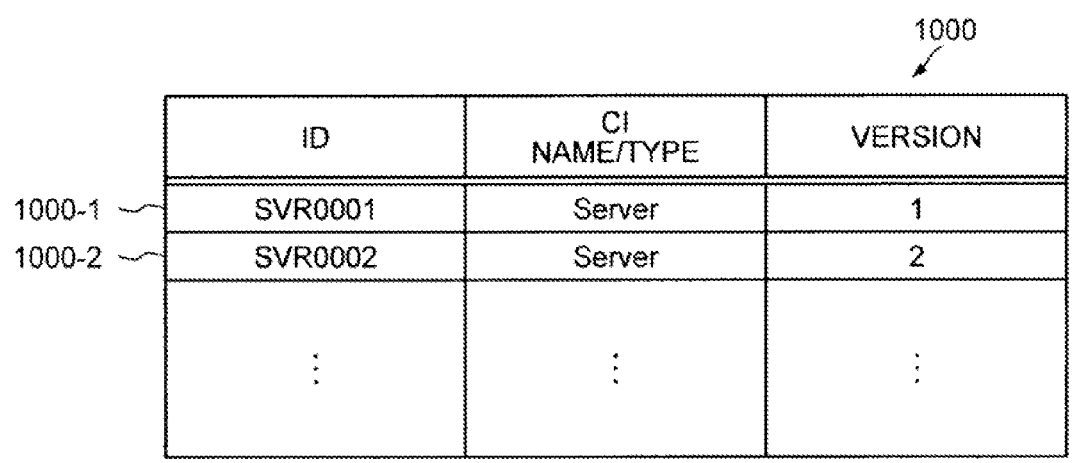
FIG. 10 is a diagram of a meta information table.

FIG. 10 is a diagram of a meta information table. In FIG. 10, the meta information table 1000 has an "ID" field, a "Name/Type" field, and a "Version" field. By entering information into the fields, the meta data for each of the data in the CMDB 110 is stored as records (for example, records 1000-1, 1000-2).

The ID field indicates the CI or relationship identifier. The Name/Type field indicates CI or relationship name/type. The Version field indicates the version number of the CMDB 110 schema corresponding to the data format of the CI or relationship. For example, record 1000-1 indicates that the version number of the schema that corresponds to the data format of the CI of the ID "SVR0001" and the CI name "Server" is "1".

Record 1000-2, for example, indicates that the version number of the schema that corresponds to the data format of the CI of the ID "SVR0002" and the CI name "Server" is "2". The version number of a schema corresponding to the format of data in the CMDB 110 can be identified by the meta information table 1000.

In returning to the description of FIG. 3, the executing unit 307 executes the process requested by the received processing request. The execution of the process, for example, is performed after the format of the data that is to be converted, has been converted. For example, if the process requested is a search process, the executing unit 307 returns to the source of the processing request, data that satisfies the condition specifying the data to be processed.

The data that is to be processed is included among the data that has been retrieved by the search unit 305, as data to be converted. Therefore, configuration may be such that after the format of the data has been converted, the executing unit 307 searches the format-converted data for the data to be processed and returns the search results to the source of the processing request. The results may be returned as a display of data on the display 208 depicted in FIG. 2, as data transmission to the source (e.g., an external computer) of the processing request, etc.

If the processing request is an update request, the executing unit 307 updates in the CMDB 110, the data that satisfies the condition specifying the data to be processed. If the processing request is a deletion request, the executing unit 307 deletes from the CMDB 110, the data that satisfies the condition specifying the data to be processed. Data that is to be deleted may be exempted from conversion to the new schema.

With reference to FIGS. 11 to 15, an example of data conversion by the data conversion apparatus 100 will be described.

Figure 11:
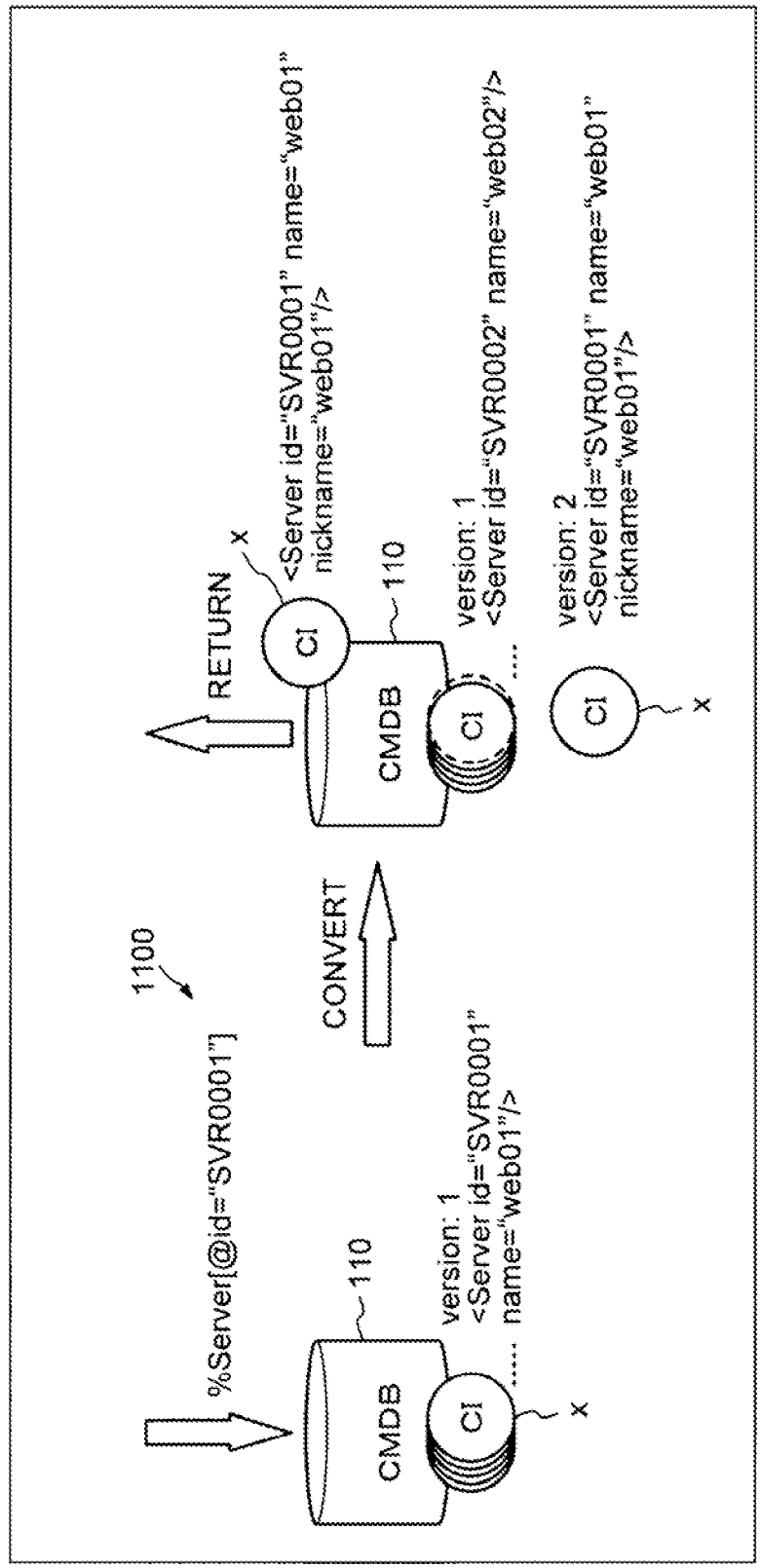
FIG. 11 is a diagram of a data conversion example when a processing request for a search is received.

FIG. 11 is a diagram of a data conversion example when a processing request for a search is received. In FIG. 11, a conditional clause 1100 represents the condition included in the processing request and specifies the data to be processed.

Here, it is assumed that the condition represented by the conditional clause 1100 has not been changed by the new schema. In other words, it is assumed that in the conditional clause 1100, the condition is defined by the oldest schema, i.e., the attribute "@id" of the CI "Server" has the oldest version number (in this example, version number "1").

In this case, the expression creating unit 304 creates the conditional clause 1100 "% Server[@id="SVR0001"]" as a search expression for retrieving data that is to be converted. The search unit 305 uses the created search expression to search the CMDB 110 for the data that is to be converted. In this example, CIx is retrieved from the CMDB 110.

In this case, the converting unit 306 converts the data format of CIx from the former schema (version number "1") to the new schema (version number "2"). For example, the attribute "nickname" is added as an attribute of CIx, where, "web01" is set as the initial attribute "nickname".

As a result, the data format of CIx is converted to the version number of the new schema, version number "2". Here, CIx, the subject of conversion, is also the data that is to be processed. Therefore, the executing unit 307 returns to the source of the processing request, CIx which is to be subjected to the requested process and whose data format has been converted to the new schema.

Figure 12:
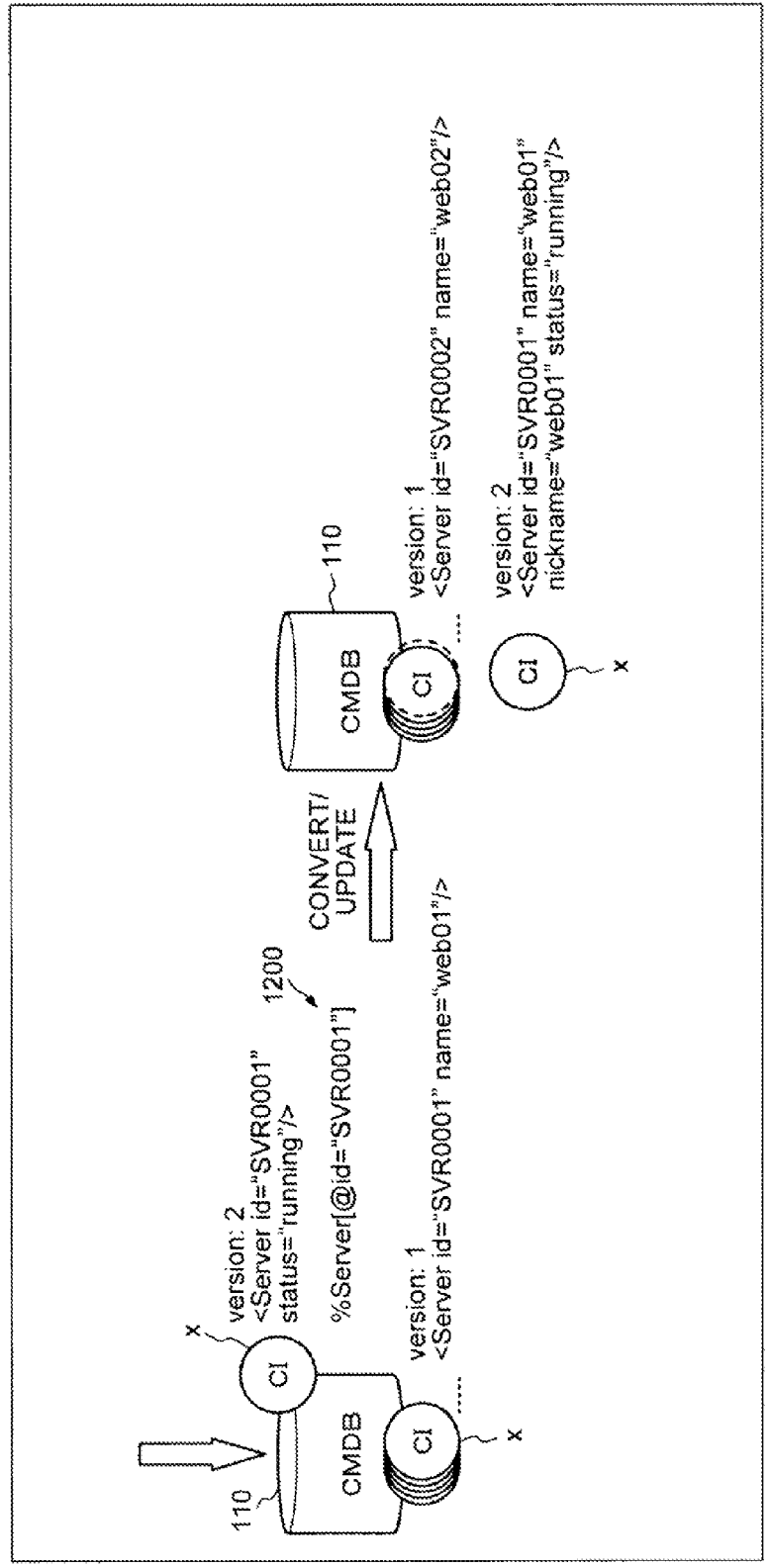
FIG. 12 is a diagram of a data conversion example when a processing request for updating is received.

FIG. 12 is a diagram of a data conversion example when a processing request for updating is received. In FIG. 12, a conditional clause 1200 represents the condition included in the processing request and specifies the data to be processed.

Here, it is assumed that the condition represented by the conditional clause 1200 has not been changed by the new schema. In other words, it is assumed that in the conditional clause 1200, the condition is defined by the oldest schema, i.e., the attribute "@id" of the CI "Server" has the oldest version number (in this example, version number "1").

In this case, the expression creating unit 304 creates the conditional clause 1200 "% Server[@id="SVR0001"]" as a search expression for retrieving data that is to be converted. The search unit 305 uses the created search expression to search the CMDB 110 for the data that is to be converted. In this example, CIx is retrieved from the CMDB 110.

In this case, the converting unit 306 converts the data format of CIx from the former schema (version number "1") to the new schema (version number "2"). For example, the attribute "nickname" is added as an attribute of CIx, where "web01" is set as the initial attribute "nickname".

As a result, the data format of CIx is converted to the version number of the new schema, version number "2". Here, CIx, the subject of conversion, is also the data that is to be processed. Therefore, the executing unit 307 updates CIx whose data format has been converted to the new schema. For example, the attribute "status" of CIx is set as "running".

Figure 13:
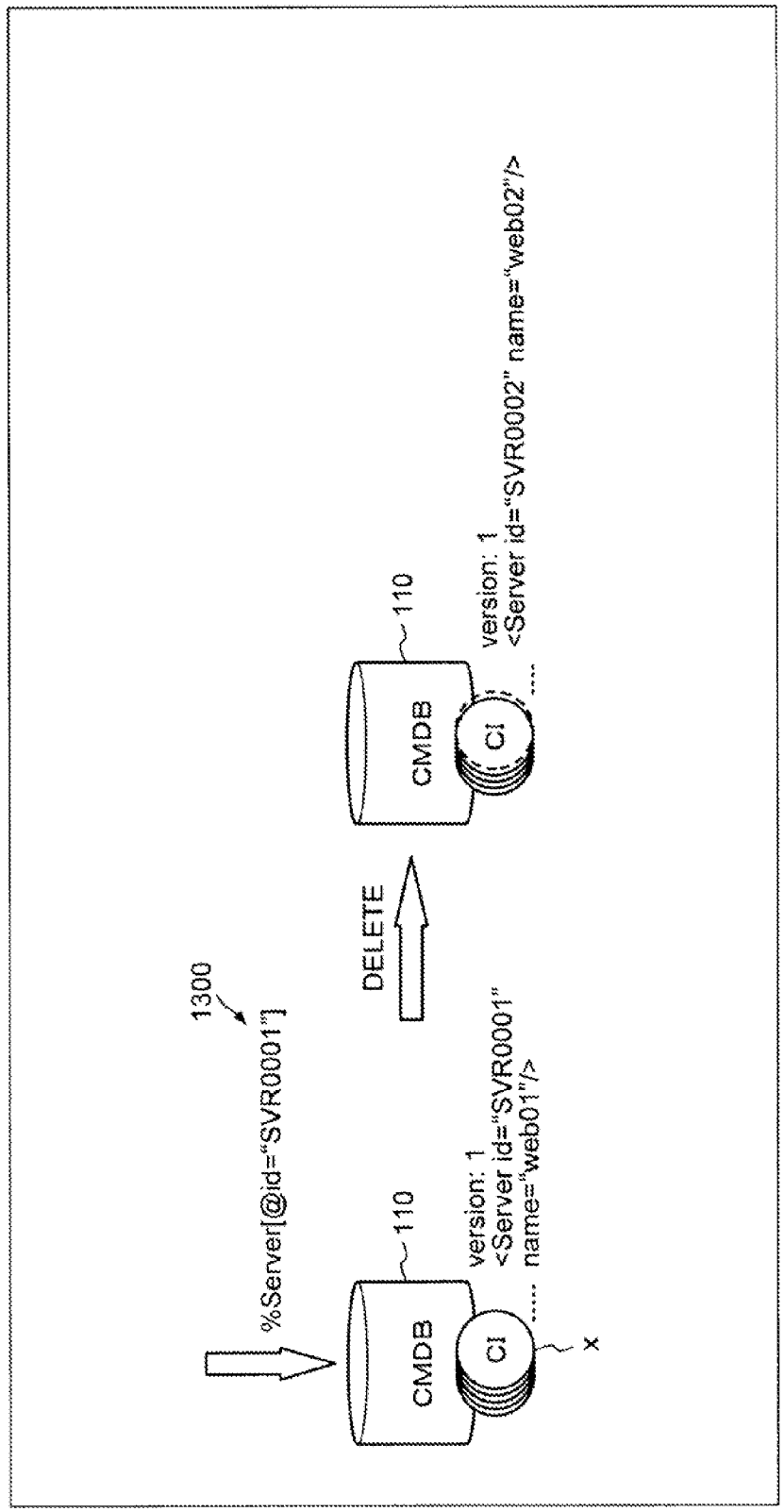
FIG. 13 is a diagram of a data conversion example when a processing request for deletion is received.

FIG. 13 is a diagram of a data conversion example when a processing request for deletion is received. In FIG. 13, a conditional clause 1300 represents the condition included in the processing request and specifies the data to be processed.

Here, it is assumed that the condition represented by the conditional clause 1300 has not been changed by the new schema. In other words, it is assumed that in the conditional clause 1200, the condition is defined by the oldest schema, i.e., the attribute "@id" of the CI "Server" has the oldest version number (in this example, version number "1").

In this case, the expression creating unit 304 creates the conditional clause 1300 "% Server[@id="SVR0001"]" as a search expression for retrieving data that is to be converted. The search unit 305 uses the created search expression to search the CMDB 110 for the data that is to be converted. In this example, CIx is retrieved from the CMDB 110.

In this case, the executing unit 307 deletes CIx from the CMDB 110. In other words, without the data format conversion of CIx by the converting unit 306, the executing unit 307 deletes CIx.

Figure 14:
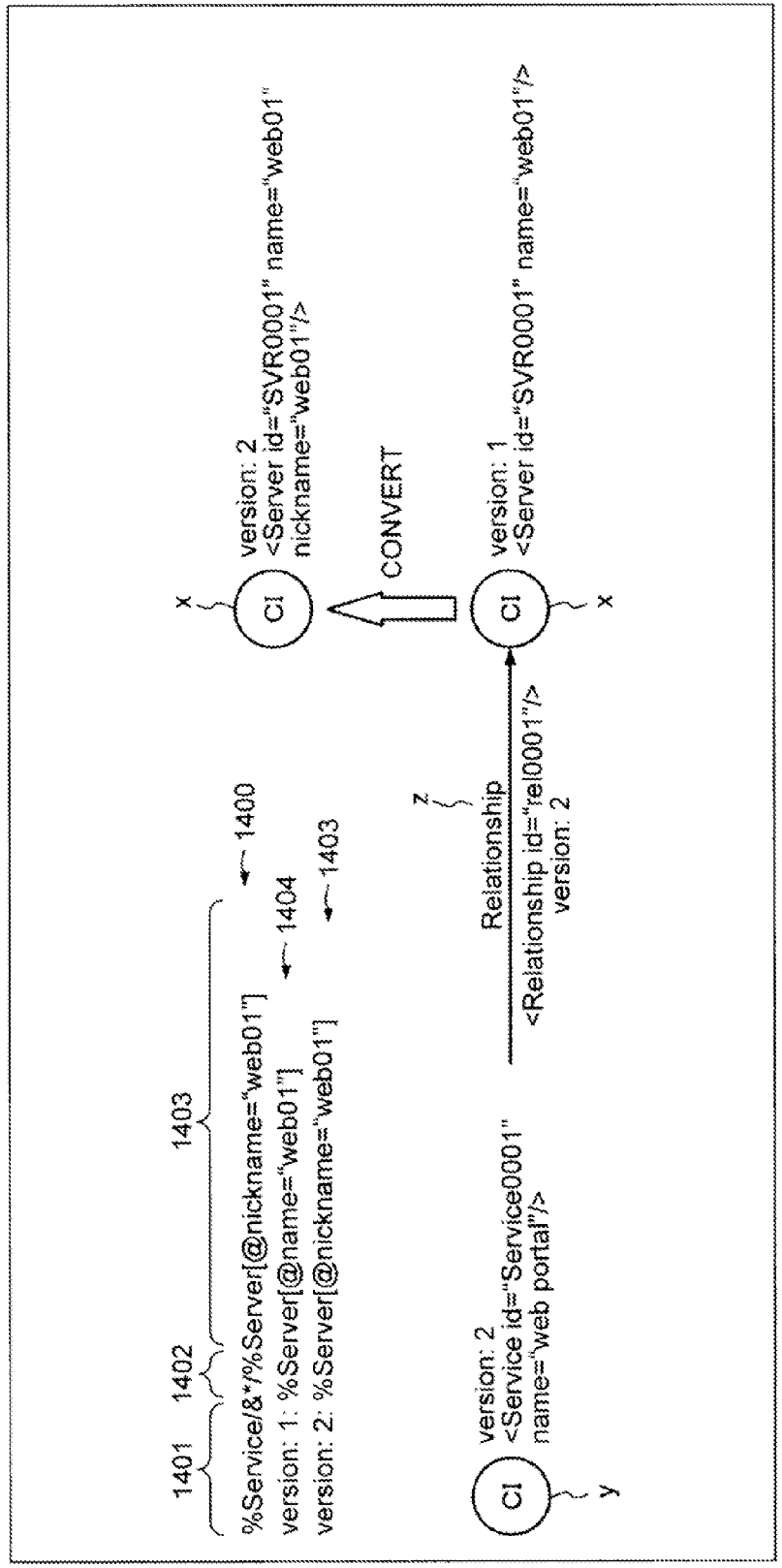
FIG. 14 is a diagram of another data conversion example when a processing request for a search is received.

FIG. 14 is a diagram of another data conversion example when a processing request for a search is received. In FIG. 14, a conditional clause 1400 represents the condition in the processing request and specifies the data to be processed. For example, the conditional clause 1400 includes a conditional clause 1401, a conditional clause 1402, and a conditional clause 1403.

Here, it is assumed that the condition represented by the conditional clause 1403 has been changed by the new schema. In other words, it is assumed that in the conditional clause 1403, the condition is not defined by the oldest schema, i.e., the attribute "@nickname" of the CI "Server" does not have the oldest version number (in this example, version number "1").

Since the conditional clause 1401 does not include the element name or the attribute name of the CI, the condition represented by the conditional clause 1401 has not been changed by the new schema. Similarly, since the conditional clause 1402 includes a relationship name, the condition represented by the conditional clause 1402 has not been changed by the new schema.

In this case, the expression creating unit 304 creates the conditional clause 1401 "% Service" as a search expression for retrieving data that is to be converted. The search unit 305 uses the created search expression to search the CMDB 110 for the data that is to be converted. In this example, CIy, whose data format has been converted to the new schema, is retrieved from the CMDB 110.

The expression creating unit 304 creates the conditional clause 1402 "&*" as a search expression for retrieving data that is to be converted. The search unit 305 uses the created search expression to search the CMDB 110 for the data to be converted. In this example, relationship z, whose data format has been converted to the new schema, is retrieved from the CMDB 110.

The expression creating unit 304 refers to the version-element correspondence table 700 and converts the conditional clause 1403 "% Server[@nickname="web01"]" to a conditional clause 1404 "% Server[@name="web01"]" that corresponds to the former schema. Next, the expression creating unit 304 regards the converted conditional clause 1404 "% Server[@name="web01"]" as a search expression for retrieving data that is to be converted. The search unit 305 uses the created search expression to search the CMDB 110 for the data that is to be converted. In this example, CIx is retrieved from the CMDB 110.

In this case, the converting unit 306 converts the data format of CIx, from the former schema (version number "1") to the new schema (version number "2"). For example, attribute "nickname" is added as an attribute of CIx, where "web01" is set as the initial attribute "nickname".

As a result, the data format of CIx is converted to the version number of the new schema, version number "2". Here, CIx, the subject of conversion, is also the data that is to be processed. Therefore, the executing unit 307 returns to the source of the processing request, CIx whose data format has been converted to the new schema. The data format of CIy and that of relationship z have already been converted to the new schema and therefore, conversion by the converting unit 306 is not performed.

It is assumed that the data format of CIx, the subject of the requested process, has already been converted to the new schema and the executing unit 307 may use a search expression that is based on the original conditional clause 1403 to retrieve data CIx, the subject of the requested process.

Figure 15:
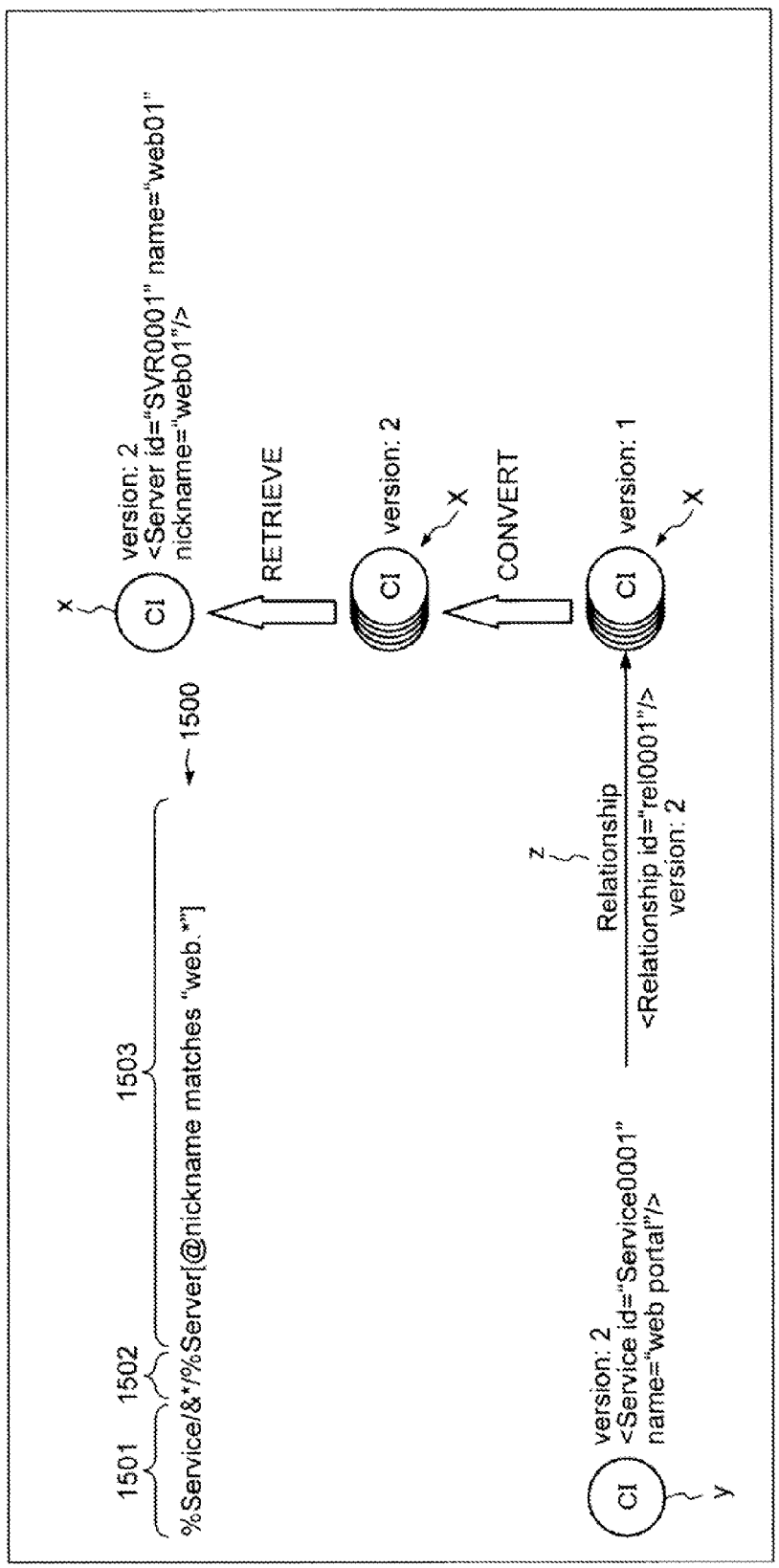
FIG. 15 is a diagram of another data conversion example when a processing request for a search is received.

FIG. 15 is a diagram of another data conversion example when a processing request for a search is received. In FIG. 15, a conditional clause 1500 represents the condition included in the processing request and specifies the data to be processed. For example, the conditional clause 1500 includes a conditional clause 1501, a conditional clause 1502, and a conditional clause 1503.

Here, it is assumed that the condition represented by the conditional clause 1503 has been changed by the new schema. Further, it is assumed that the condition represented by the conditional clause 1503 cannot be converted to a conditional clause that corresponds to the former schema. The conditions represented by the conditional clauses 1501, 1502 have not been changed by the new schema.

In this case, the expression creating unit 304 creates the conditional clause 1501 "% Service" as a search expression for retrieving data that is to be converted. The search unit 305 uses the created search expression to search the CMDB 110 for that data to be converted. In this example, CIy, whose data format has been converted to the new schema, is retrieved from the CMDB 110.

The expression creating unit 304 creates the conditional clause 1502 "&*" as a search expression for retrieving data that is to be converted. The search unit 305 uses the created search expression to search the CMDB 110 for the data to be converted. In this example, the relationship z, whose data format has been converted to the new schema, is retrieved from the CMDB 110.

Based on a character string "% Server" that is in the conditional clause 1503 and specifies the subset that includes all of the data to be processed, the expression creating unit 304 creates a search expression for retrieving data that is to be converted. In this example, CIx is associated with CIy by the relationship z.

Therefore, the expression creating unit 304, for example, creates the conditional clause "% Service/&*/% Server" as a search expression for retrieving data that is to be converted. The search unit 305 uses the created search expression to search the CMDB 110 for the data that is to be converted. In this example, a dataset X is retrieved from the CMDB 110.

In this case, the converting unit 306 converts the data format of each CI included in the retrieved data set X, from the former schema (version number "1") to the new schema (version number "2"). As a result, the data format of each CI included in the data set X is converted to the version number "2" of the new schema.

Subsequently, the executing unit 307, for example, uses the search expression that is based in the original conditional clause 1403 to search the data set X for data that is to be processed. In this example, CIx is retrieved from the data set X. In this case, the executing unit 307 returns CIx to the source of the processing request.

Next, an example will be described of a data determining method of determining the data whose format is to be simultaneously converted together with the retrieved data that is to be converted. The search unit 305 searches for data (data to be subject to simultaneous conversion) that is associated with the retrieved data subject to conversion. Data to be subject to simultaneous conversion is, for example, another CI associated, by a relationship, with a CI that is subject to conversion and the relationship between the two CIs.

For example, the search unit 305 identifies a CI that is to be subject to conversion, from the search results table 800 depicted in FIG. 8. The search unit 305 searches the CMDB 110 for a relationship that includes the ID of the retrieved CI.

The search unit 305 further searches the CMDB 110 for another CI associated, by the retrieved relationship, with the CI that is subject to conversion. The other CI is identified by the ID that not the ID of the retrieved CI subject to conversion, among the IDs of the two associated CIs described in the relationship.

Consequently, another CI associated, by a relationship, with the CI subject to conversion and the relationship thereof can be retrieved as data to be subject to simultaneous conversion. In this example, associations between data in the CMDB 110 will be described.

Figure 16:
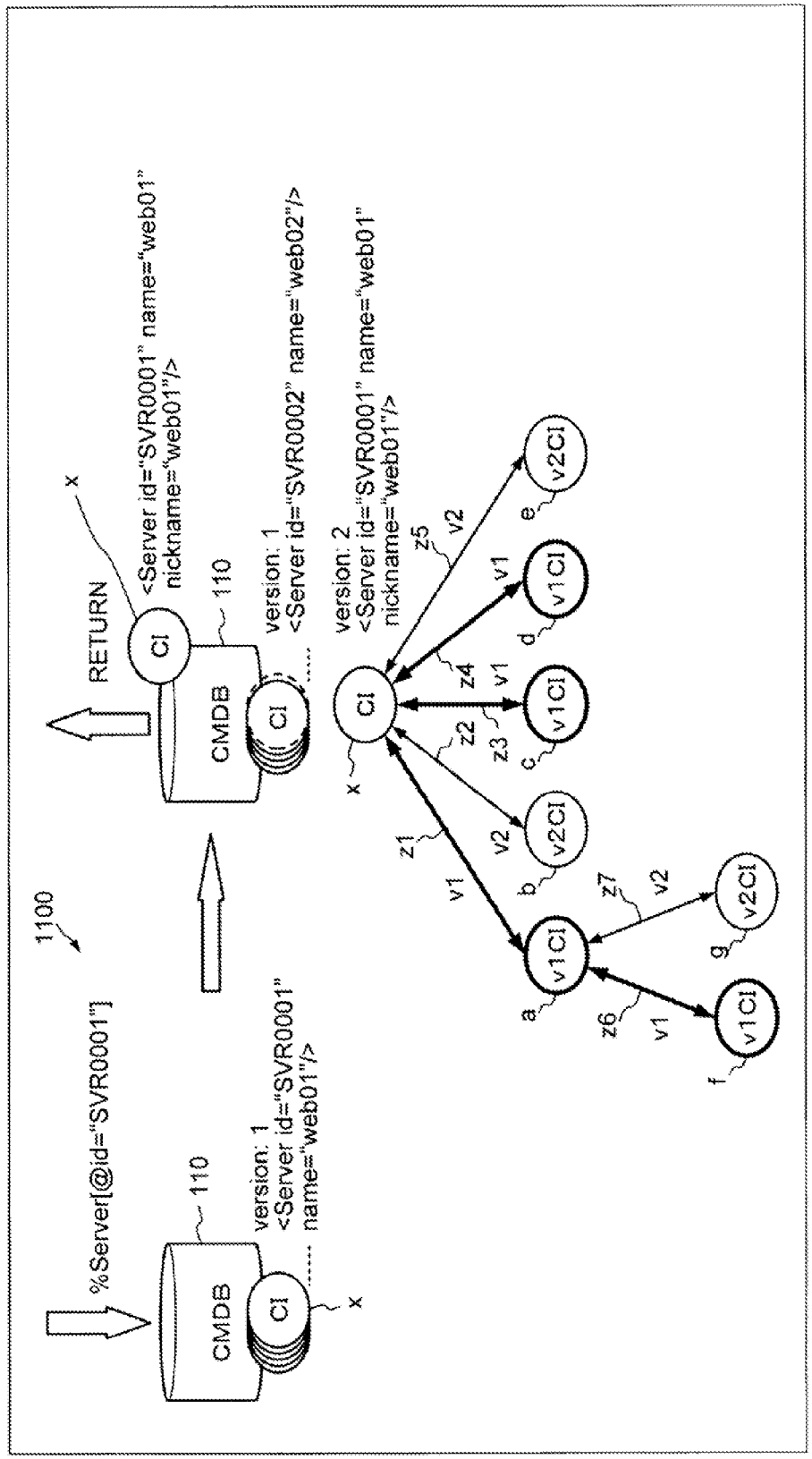
FIG. 16 is a diagram of associations between data.

FIG. 16 is a diagram of associations between data. In FIG. 16, CIx is a CI subject to conversion (refer to FIG. 11). CIa to CIe are other CIs respectively associated, by relationships z1 to z5 (double headed arrows in drawing), to CIx. In FIG. 16, "v1" indicated by the CIs and the relationships, represents version number "1" of the schema; "v2" represents version number "2" of the schema.

In the example depicted in FIG. 16, the search unit 305 retrieves from the CMDB 110 and as the data to be subject to simultaneous conversion, CIa to CIe respectively associated, by a respective relationship, with CIx and further retrieves the respective relationships z1 to z5.

Among the retrieved CIa to CIe and the relationships z1 to z5, the converting unit 306 converts (from the former schema to the new schema) the format of the data that has yet to be converted. The version number of the schema corresponding to the data formats of CIa to CIe and the relationships z1 to z5 is, for example, identified from the meta information table 1000 depicted in FIG. 10.

In this example, the schema of version number "1" is the former schema and the schema of version number "2" is the new schema. Among CIa to CIe and the relationships z1 to z5 in the example depicted in FIG. 16, CIa, CIc, CId, the relationships z1, z3, and z4 are data that have yet to be converted. Consequently, the converting unit 306 converts the data formats of CIa, CIc, CId, the relationships z1, z3, and z4, from the former schema to the new schema.

As a result, the data formats of the CIs associated with the CI subject to conversion and the relationships therebetween can be converted from the former schema to the new schema.

Configuration may be such that the search unit 305 retrieves from the CMDB 110 and as data to be subject to simultaneous conversion, CIf and CIg respectively associated, by relationships z6 and z7, with CIa, and the relationships z6, z7. In this case, the converting unit 306 further converts from the former schema to the new schema, the unconverted data formats of CIf and the relationship z6, among CIf, CIg and the relationships z6, z7, respectively retrieved.

As a result, the data format of an arbitrary CI having a connection with the CI subject to conversion, via a given CI associated with the CI subject to conversion, and the data format of the relationship between the arbitrary CI and the given CI can be converted from the former schema to the new schema.

On the other hand, if the number of data to be subject to simultaneous conversion increases, the time consumed for converting the data formats to the new schema increases. Thus, configuration may be such that from among the data retrieved as data to be subject to simultaneous conversion (hereinafter, simultaneous conversion data candidate), the determining unit 308 determines data that is to actually be subject to simultaneous conversion.

For example, within a preliminarily set given (data) count $\alpha$, the determining unit 308 determines data to be subject to simultaneous conversion, from among simultaneous conversion data candidates. In this example, the given count $\alpha$ (for example, $\alpha=3$) is a value prescribing an upper limit count of the data to be subject to simultaneous conversion. The given count $\alpha$ is, for example, stored to a storage device such as the ROM 202, the RAM 203, the magnetic disk 205, and the optical disk 207.

For example, within the given count $\alpha$ and from among simultaneous conversion data candidates, the determining unit 308 may determine arbitrary CIs to be the data to be subject to simultaneous conversion. In this case, the determining unit 308 may further determine, as data to be subject to simultaneous conversion, the relationship between the determined CI and the CI subject to conversion. The converting unit 306 converts, from the former schema to the new schema, the format of the data determined as data to be subject to simultaneous conversion.

Configuration may be such that based on priority levels respectively set for each simultaneous conversion data candidate CI, the determining unit 308 determines a simultaneous conversion candidate CI having a high priority level among the simultaneous conversion candidate CIs to be a CI subject to simultaneous conversion (hereinafter, simultaneous conversion CI).

In this case, among the simultaneous conversion candidate CIs, the determining unit 308 may determine as a simultaneous conversion CI, a simultaneous conversion candidate CI having a priority level that is greater than or equal to a threshold $\beta$. The threshold $\beta$ is, for example, stored to a storage device such as the ROM 202, the RAM 203, the magnetic disk 205, and the optical disk 207.

With reference to FIGS. 17 to FIG. 20 an example of a determining process of determining as a simultaneous conversion CI, a simultaneous conversion candidate CI having a high priority level among multiple simultaneous conversion candidate CIs. With reference to FIG. 17, a simultaneous conversion candidate CI list 1700 storing simultaneous conversion candidate CIs will be described.

FIG. 17 is a diagram of an example of a simultaneous conversion candidate CI list. In FIG. 17, the simultaneous conversion candidate CI list 1700 includes an "ID" field, a "CI Name/Type" field, and a "Data Contents" field. By entering information into the fields, the retrieved simultaneous conversion candidate CIs are stored as records.

The ID field indicates the simultaneous conversion candidate CI identifier. The CI Name/Type field indicates the name/type of the simultaneous conversion candidate CI. The Data Contents field indicates the simultaneous conversion candidate CI contents. The simultaneous conversion candidate CIs stored in the simultaneous conversion candidate CI list 1700 are unconverted data whose format has not been converted from the former schema to the new schema.

The determining unit 308 refers to the simultaneous conversion candidate CI list 1700 and creates a CI type list 1800 such as that depicted in FIG. 18, listing the types of simultaneous conversion candidate CIs. A simultaneous conversion candidate CI type is the CI name/type of a simultaneous conversion candidate CI. Here, an example of the CI type list 1800 will be described.

FIG. 18 is a diagram of an example of a CI type list. In FIG. 18, the CI type list 1800 indicates, in a list-form, the types "Incident" and "NetworkDevice" of the simultaneous conversion candidate CIs in the simultaneous conversion candidate CI list 1700.

The determining unit 308 identifies, as a condition specifying the data to be processed, the type of each CI to be subject to conversion and the occurrence frequency for each type of simultaneous conversion candidate CI in the CI type list 1800. The occurrence frequency represents a rate at which each simultaneous conversion candidate CI type is specified. For example, the determining unit 308 refers to a statistical table 1900 (depicted in FIG. 19) and identifies an occurrence frequency for each simultaneous conversion candidate CI type. Here, an example of the statistical table 1900 will be described.

FIG. 19 is a diagram of an example of a statistical table. In FIG. 19, the statistical table 1900 includes a "First Type" field, a "Second Type" field, and a "Frequency" field. By entering information into the fields, statistical information is stored as a record for each first and second type combination.

The First Type field indicates as the condition specifying the data to be processed, the CI Name/Type specified in the past. The Second Type field indicates as the condition specifying the data to be processed, the CI Name/Type specified together with the first type CI Name/Type. The Frequency field indicates an index value that represents the frequency that the second type CI Name/Type of is specified together with the first type CI Name/Type, as a condition specifying the data to be processed.

The determining unit 308 refers to the statistical table 1900 and identifies an occurrence frequency for each simultaneous conversion candidate CI type in the CI type list 1800. The statistical table 1900 is a statistical table in which the type of the CI subject to conversion (CI Name/Type) is indicated in the First Type field. In other words, the statistical table 1900 is a statistical table that is used when the type of the CI subject to conversion is "Server".

Here, it is assumed that the type of the CI subject to conversion is "Server". In this case, the determining unit 308 refers to the statistical table 1900 and identifies the occurrence frequency "0.3" for the type "Incident", which is the type of the simultaneous conversion candidate CI and included in the CI type list 1800. Further, the determining unit 308 refers to the statistical table 1900 and identifies the occurrence frequency "0.1" for the type "NetworkDevice", which is the type of the simultaneous conversion candidate CI and included in the CI type list 1800.

Next, based on the occurrence frequencies respectively identified for each simultaneous conversion candidate CI type, the determining unit 308 selects a type having an occurrence frequency that is greater than or equal to the threshold $\beta$. In this case, configuration may be such that, the determining unit 308 selects the type having an occurrence frequency that is greater than or equal to the threshold $\beta$ and that among the occurrence frequencies for each simultaneous conversion candidate CI type, is the largest. For example, the threshold $\beta$ may be assumed as "$\beta=0.2$".

In this example, the determining unit 308 selects the type "Incident" having an occurrence frequency that is greater than or equal to the threshold $\beta$. The determining unit 308, from the simultaneous conversion candidate CI list 1700, selects a simultaneous conversion candidate CI of the selected type "Incident" and determines the selected simultaneous conversion candidate CI as a simultaneous conversion CI. In other words, using the respective occurrence frequencies for each simultaneous conversion candidate CI type as a priority level of the simultaneous conversion candidate CIs, the determining unit 308 determines a simultaneous conversion candidate CI having a high occurrence frequency to be a simultaneous conversion CI.

Figure 20:
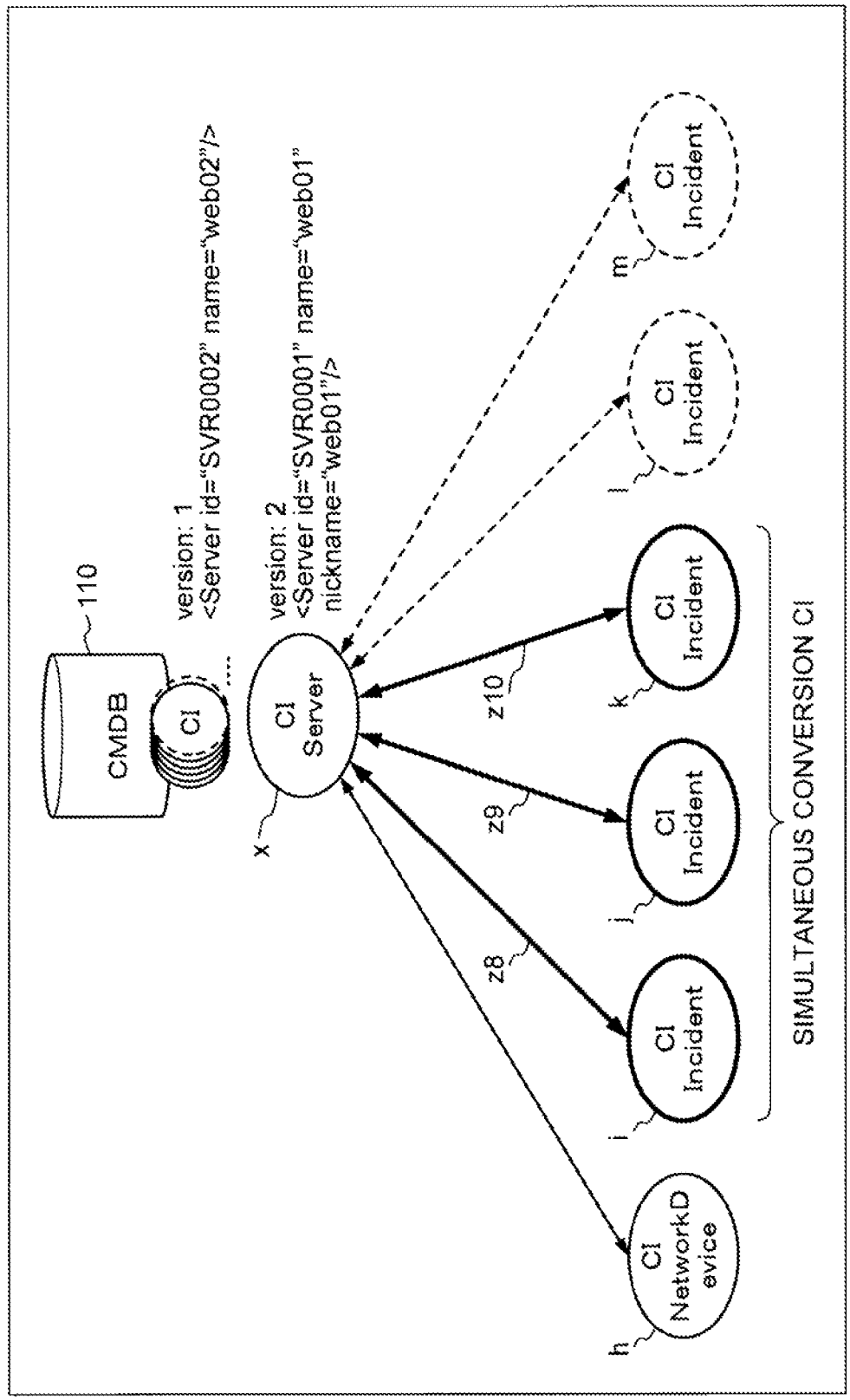
FIG. 20 is a diagram of a practical example of determining a simultaneous conversion CI from among simultaneous conversion candidate CIs.

FIG. 20 is a diagram of a practical example of determining a simultaneous conversion CI from among simultaneous conversion candidate CIs. In FIG. 20, CIx is the CI subject to conversion; CIh to CIm are simultaneous conversion candidate CIs; the type of the CI subject to conversion is "Server"; among the simultaneous conversion candidate CIs, the type of CIh is "NetworkDevice" and the type of CIi to CIm is "Incident".

In this case, as described, the determining unit 308 refers to the statistical table 1900 and identifies the occurrence frequency "0.3" for the simultaneous conversion candidate CIs of the type "Incident". The determining unit 308 further refers to the statistical table 1900 and identifies the occurrence frequency "0.1" for the type "NetworkDevice", which is the type of the simultaneous conversion candidate CI.

Next, from among the respective occurrence frequencies for each of the simultaneous conversion candidate CIs, the determining unit 308 selects the type "Incident" for which the occurrence frequency is greater than or equal to the threshold $\beta$ ($\beta=0.2$). Subsequently, from the simultaneous conversion candidate CI list 1700, the determining unit 308 selects, within the given count $\alpha$ ($\alpha=3$), simultaneous conversion candidate CIs of the type "Incident" and determines the selected simultaneous conversion candidate CIs to be simultaneous conversion CIs.

The determining unit 308 determines the relationships expressing the association between the CIx subject to conversion and the simultaneous conversion CIs, to be data that are to be subject to simultaneous conversion. In the example depicted in FIG. 20, CIi, CIj, and CIk are determined to be simultaneous conversion CIs and relationships z8, z9, and z10 are determined to be data that are to be subject to simultaneous conversion.

Creation of the statistical table 1900 depicted in FIG. 19 will be described. For example, the determining unit 308 creates the statistical table 1900, based on log information related to a processing request concerning the CMDB 110. Here, an example of log information related to a processing request concerning the CMDB 110 will be described.

Figure 21:
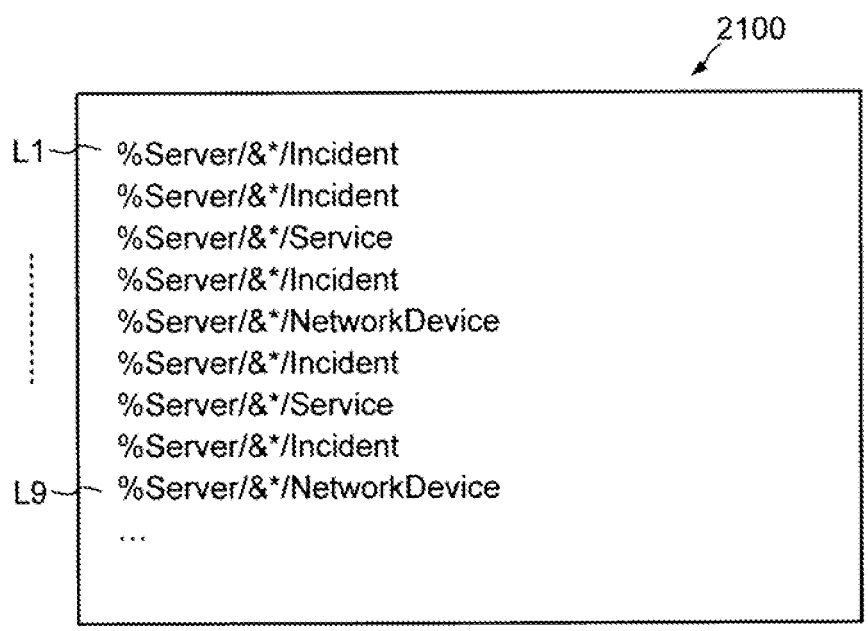
FIG. 21 is a diagram of an example of log information.

FIG. 21 is a diagram of an example of log information. In FIG. 21, log information 2100 is a collection of logs (e.g., logs L1 to L9) related to a processing request concerning the CMDB 110. The logs, for example, indicate the conditional clauses included in the processing requests received by the receiving unit 301 in the past.

For example, logs L1 to L9, as the condition specifying the data to be processed, includes at least the type "Server". The determining unit 308, for example, based on the log information 2100, calculates an index value representing the occurrence frequency of each type of CI associated, by a relationship "&*", with a CI of the type "Server".

An example of an occurrence frequency for the type "Incident", which is the type of a CI associated, by a relationship "&*", to a CI of the type "Server" will be described. In this case, the determining unit 308 counts in the log information 2100, the number of logs that specify the type "Server" and the type "Incident" as the condition specifying the data to be processed.

Next, the determining unit 308 counts the total number of logs in the log information 2100. The determining unit 308 divides the number of logs that specify the type "Server" and the type "Incident" by the total number of logs and thereby, calculates an index value representing the occurrence frequency of the type "Incident".

For example, it is assumed that the number of logs that specify the type "Server" and the type "Incident" is "30" and the total number of logs is "100". In this case, the determining unit 308 divides "30" by "100" to calculate an index value of "0.3", representing the occurrence frequency of the type "Incident".

The calculated index values indicating the occurrence frequency for each type, for example, are stored to the statistical table 1900 depicted in FIG. 19. For example, the index value "0.3" representing the occurrence frequency of the type "Incident", is recorded in the statistical table 1900 as the frequency that the first type "Server" and the second type "Incident" are specified as the condition specifying the data to be processed.

Although in the description above, a statistical table (e.g., the statistical table 1900) is created from past log information (e.g., the log information 2100), configuration is not limited hereto. For example, the statistical table 1900 may be manually prepared in advance and stored to a storage device such as the ROM 202, the RAM 203, the magnetic disk 205, and the optical disk 207.

A determining method of determining, from among simultaneous conversion candidate CIs, a CI that is the subject of the requested process and targeted by a processing request that specifies a point of failure, will be described. First, a simultaneous conversion candidate CI list 2200 storing simultaneous conversion candidate CIs will be described.

FIG. 22 is a diagram of another example of a simultaneous conversion candidate CI list. In FIG. 22, the simultaneous conversion candidate CI list 2200 includes an "ID" field, a "CI Name/Type" field, a "Point" field, and a "Data Contents" field. By entering information into the fields, the retrieved simultaneous conversion candidate CIs are stored as records.

The ID field indicates the simultaneous conversion candidate CI identifier. The CI Name/Type field indicates the name/type of the simultaneous conversion candidate CI. The Point field indicates association points of the simultaneous conversion candidate CI. The greater the association points are, the higher the frequency is, which is the subject of the requested process and targeted by a processing request that specifies a point where the simultaneous conversion candidate CI fails. The Data Contents indicate the contents of the simultaneous conversion candidate CI. The simultaneous conversion candidate CIs stored in the simultaneous conversion candidate CI list 2200 are unconverted data whose format has not been converted from the former schema to the new schema.

The determining unit 308 refers to the simultaneous conversion candidate CI list 2200 and creates an association list 2300 such as that depicted in FIG. 23. The association list 2300 indicates pairs of CIs that are included in the simultaneous conversion candidate CI list 2200 and associated by a relationship. Here, an example of the association list 2300 will be described.

FIG. 23 is a diagram of an example of an association list. In FIG. 23, the association list 2300 includes an "Src CI ID" field, a "Dst CI ID" field, and a "Relationship ID" field. By entering information into the fields, pair information P1, P2 is stored as records.

Here, the direction of the association between CIs is defined. The association source is abbreviated as "src" and the association destination is abbreviated as "dst". In other words, the Src CI ID field indicates the identifier of the CI that is the source and the Dst CI ID field indicates the identifier of the CI that is the destination. The Relationship ID field indicates the identifier of the relationship.

The pair information P1 indicates that the source CI "SVR0001" and the destination CI "SERVICE003" are associated by a relationship "REL0001". The pair information P2 indicates that the source CI "SVR0001" and the destination CI "PSVR004" are associated by a relationship "REL0002".

The determining unit 308 selects pair information from the association list 2300 and identifies the association class corresponding to the selected pair information. Here, the association class defines the relationship between CIs that are associated by a relationship. Here, as examples of association classes, a dependency class, an impact class, and a p-c class are defined.

The dependency class is a relationship where if the source CI is down and operation stops, the corresponding destination CI goes down. For example, the dependency class applies to an association in which a physical machine is the source and a virtual machine is the destination.

The impact class is a relationship where a performance anomaly of the source CI impacts the same performance point of the destination CI. For example, the impact class applies to an association in which a virtual machine is the source and a physical machine is the destination.

The p-c class is a relationship in which the destination CI uses the source CI. For example, the p-c class applies to an association in which a virtual machine is the source and a tenant providing a service is the destination.

For example, the determining unit 308 refers to a rule list 2400 (depicted in FIG. 24) that lists rules applicable to association classes and identifies the association class that corresponds to the selected pair information. The rule list 2400, for example, is stored to a storage device such as the ROM 202, the RAM 203, the magnetic disk 205, and the optical disk 207. Here, an example of the rule list 2400 will be described.

Figure 24:
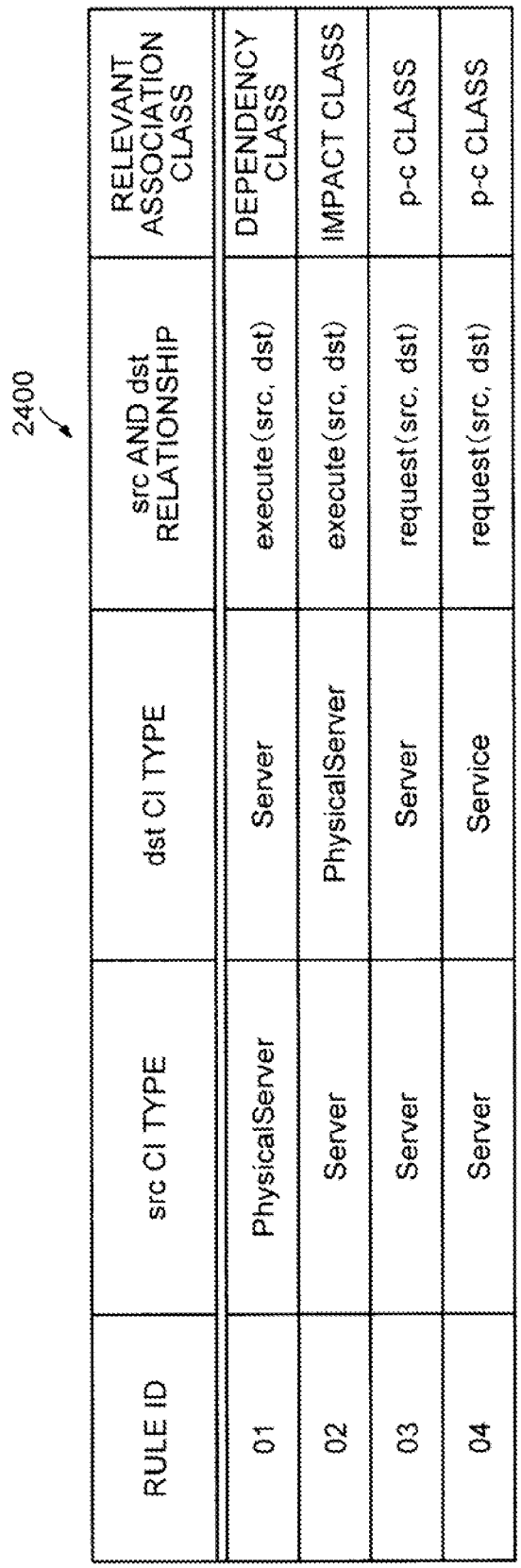
FIG. 24 is a diagram of an example of a rule list for association classes.

FIG. 24 is a diagram of an example of a rule list for association classes. In FIG. 24, the rule list 2400 includes rules 01 to 04, as rules applicable to association classes.

Rule 01 prescribes application to the dependency class when the association is execute(src,dst), where the source is a physical machine, the destination is a virtual machine, and the source CI executes the destination.

Rule 02 prescribes application to the impact class when the association is execute(src,dst), where the source is a virtual machine, the destination is a physical machine, and the source CI executes the destination CI.

Rule 03 prescribes application to the p-c class when the association is request (src,dst), where the source is a virtual machine, the destination is a virtual machine, and the source CI makes a request to the destination CI.

Rule 04 prescribes application to the p-c class when the association is request (src,dst), where the source is a virtual machine, the destination is a service, and the source CI makes a request to the destination CI.

The determining unit 308 searches the rule list 2400 for a rule that corresponds to the selected pair information. Here, it is assumed that n rules corresponding the pair information are retrieved from the rule list 2400.

In this case, the determining unit 308 refers to the simultaneous conversion candidate CI list 2200 and identifies a simultaneous conversion candidate CI of the type of the source CI specified by the pair information. In the simultaneous conversion candidate CI list 2200, the determining unit 308 adds "n" to the Point field of identified simultaneous conversion candidate CI.

The determining unit 308 further refers to the simultaneous conversion candidate CI list 2200 and identifies a simultaneous conversion candidate CI of the type of the destination CI specified by pair information. In the simultaneous conversion candidate CI list 2200, the determining unit 308 adds "n" to the Point field of the identified simultaneous conversion candidate CI.

For example, if the pair information P1 is selected, for the source CI type and the destination CI type pair, rule 04 is retrieved, which is applicable to a "Server" and "Service" association. In other words, the p-c class is specified as the association class that corresponds to the pair information P1.

In this case, the determining unit 308 refers to the simultaneous conversion candidate CI list 2200 and identifies the simultaneous conversion candidate CIs "SVR0001", "SVR0002" of the type "Server", which is the type of the source CI specified by the pair information P1. In the simultaneous conversion candidate CI list 2200, the determining unit 308 adds "1" to the Point fields of the identified simultaneous conversion candidate CIs "SVR0001", "SVR0002".

The determining unit 308 further refers to the simultaneous conversion candidate CI list 2200 and identifies the simultaneous conversion candidate CI "SERVICE003" of the type "Service", which is the type of the destination CI specified by the pair information P1. In the simultaneous conversion candidate CI list 2200, the determining unit 308 adds "1" to the Point field of the identified simultaneous conversion candidate CI "SERVICE003".

The determining unit 308 repeats the above series of processes until, for example, unselected pair information that has yet to be selected no longer remains in the association list 2300. The determining unit 308 refers to the simultaneous conversion candidate CI list 2200 and determines a simultaneous conversion candidate CI whose point value is greater than or equal to a threshold γ to be a simultaneous conversion CI. The threshold γ(e.g., γ=1) is, for example, preliminarily stored to a storage device such as the ROM 202, the RAM 203, the magnetic disk 205, and the optical disk 207.

As a result, among the simultaneous conversion candidate CIs, a CI having a high frequency, which is to be processed and is targeted by a processing request that specifies a point of failure, can be determined as a simultaneous conversion CI.

Next, various processing procedures by the data conversion apparatus 100 according to the embodiment will be described. First, the procedure of an updating process for the schema change table by the data conversion apparatus 100 will be described. The updating process for the schema change table, for example, is performed when a new schema of the CMDB 110 is registered.

Figure 25:
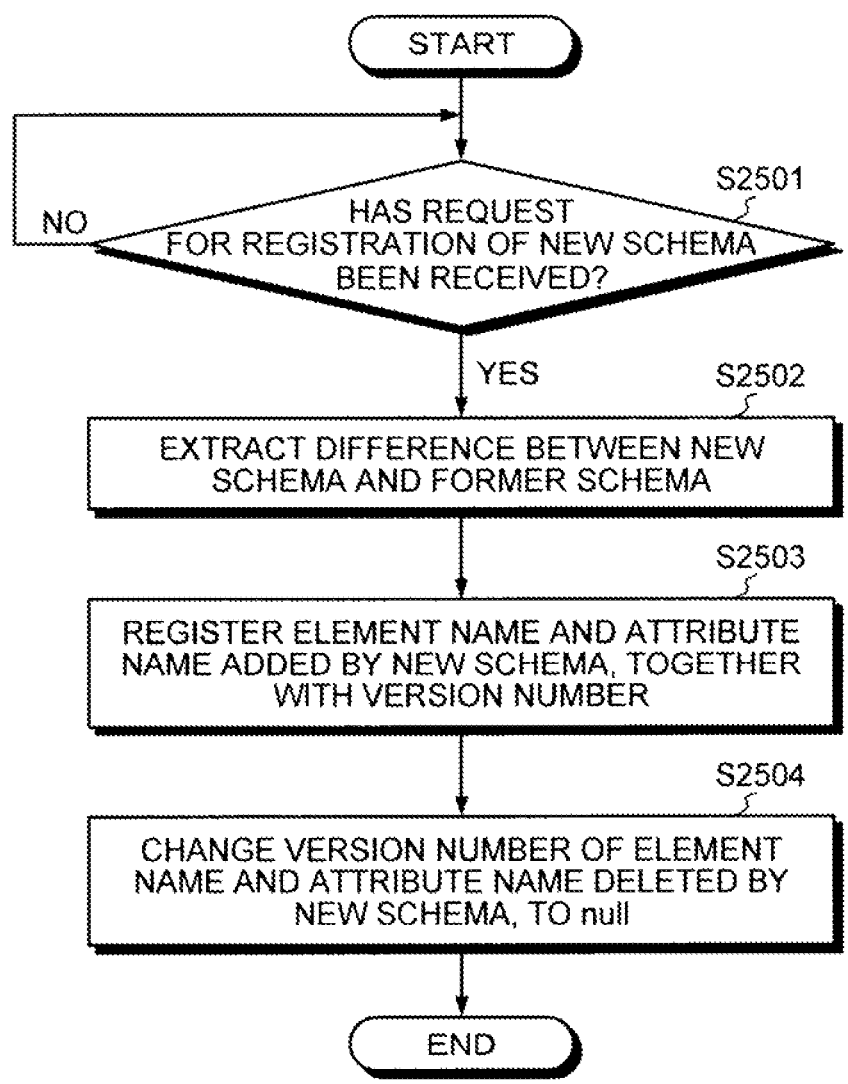
FIG. 25 is a flowchart of an updating process for the schema change table performed by the data conversion apparatus.

FIG. 25 is a flowchart of an updating process for the schema change table performed by the data conversion apparatus according to the embodiment. As depicted in the flowchart in FIG. 25, the receiving unit 301 judges whether registration of a new schema of the CMDB 110 has been received (step S2501).

Waiting occurs until registration of a new schema is received (step S2501: NO) and upon receipt (step S2501: YES), the difference creating unit 302 compares the former schema and the new schema of the CMDB 110, and extracts differences (step S2502).

As difference information that indicates differences between the former schema and the new schema, the difference creating unit 302 registers to the schema change table 500, the element names and the attribute names added by the new schema as well as the version number of the new schema (step S2503).

As difference information that indicates difference between the former schema and the new schema, the difference creating unit 302 changes to null, version numbers of the element names and the attribute names deleted by the new schema (step S2504), ending the processing according to the flowchart.

As a result, difference information can be created that indicates the difference between the former schema and the new schema of the CMDB 110.

Next, a procedure of the data conversion process by the data conversion apparatus 100 will be described.

Figure 26:
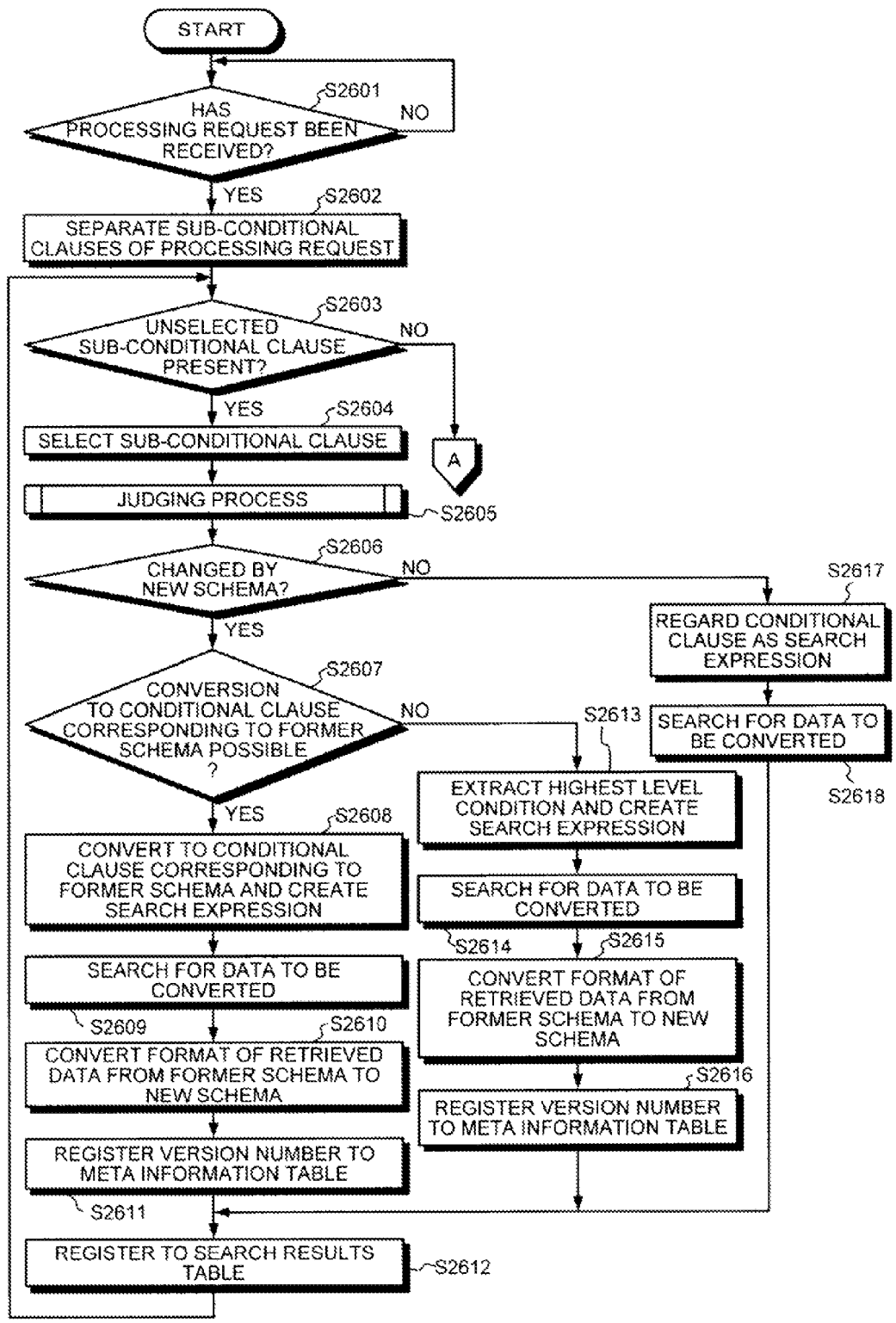
FIGS. 26 and 27 are flowcharts of a procedure of the data conversion process by the data conversion apparatus.
Figure 27:
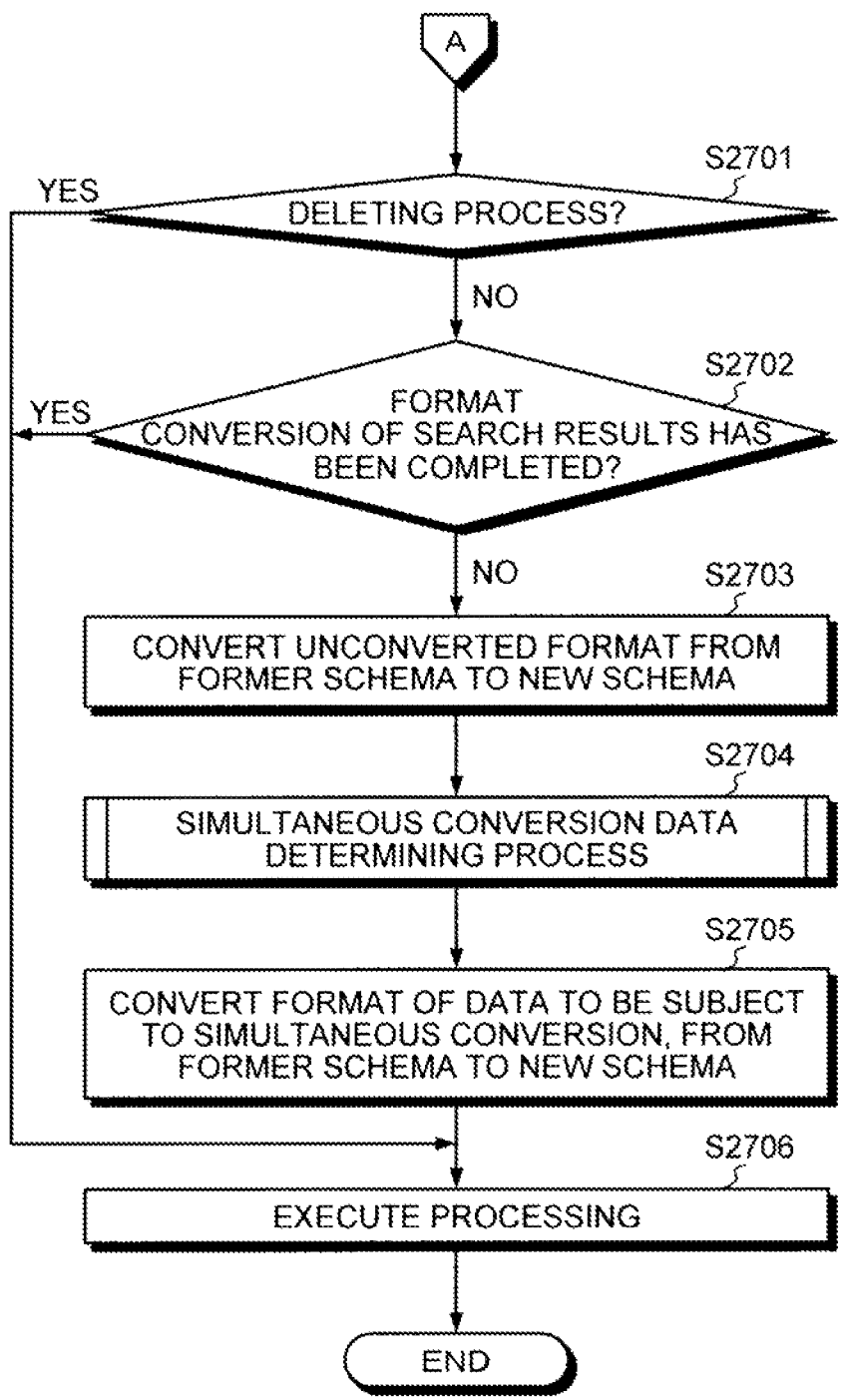

FIGS. 26 and 27 are flowcharts of a procedure of the data conversion process by the data conversion apparatus according to the embodiment. As depicted in the flowchart in FIG. 26, the receiving unit 301 judges whether a processing request concerning the CMDB 110 has been received (step S2601).

Waiting occurs until a processing request is received (step S2601: NO) and upon receipt (step S2601: YES), the judging unit 303 separates into sub-conditional clauses, the conditional clause in the processing request and specifying the data to be processed (step S2602). For example, the judging unit 303 separates the conditional clause into the CIs and the relationships, which are separated by a "/".

The judging unit 303 judges whether an unselected sub-conditional clause is present among the sub-conditional clauses (step S2603). If an unselected sub-conditional clause is present (step S2603: YES), the judging unit 303 selects one of the sub-conditional clauses (step S2604).

The judging unit 303 executes a judging process of judging whether the selected sub-conditional clause has been changed by the new schema (step S2605). If the sub-conditional clause has been changed by the new schema (step S2606: YES), the expression creating unit 304 refers to the version-element correspondence table 700 and judges whether the sub-conditional clause can be converted to a conditional clause that corresponds to the former schema (step S2607).

If conversion is possible (step S2607: YES), the expression creating unit 304 refers to the version-element correspondence table 700, converts the sub-conditional clause to a conditional clause that corresponds to the former schema, and creates a search expression (step S2608). The search unit 305 uses the created search expression to search the CMDB 110 for data that is to be converted (step S2609).

The converting unit 306 converts the format of the retrieved data, from the former schema to the new schema (step S2610); and for data whose format has been changed, the converting unit 306 registers the version number of the new schema to the meta information table 1000 (step S2611).

Subsequently, the search unit 305 registers to the search results table 800, the retrieved data that is to be converted (step S2612); and the flow returns to step S2603.

At step S2607, if conversion is not possible (step S2607: NO), the expression creating unit 304 extracts the highest level condition from the sub-conditional clause and creates a search expression for retrieving data that is to be converted (step S2613). The search unit 305 uses the created search expression to search the CMDB 110 for the data that is to be converted (step S2614).

The converting unit 306 converts from the former schema to the new schema, the format of the retrieved data (step S2615), and for the data whose format has been converted, the converting unit 306 registers the version number of the new schema to the meta information table 1000 (step S2616); and the flow proceeds to step S2612. The results of the conversion are reflected to the CMDB 110.

At step S2606, if the sub-conditional clause has not been changed by the new schema (step S2606: NO), the expression creating unit 304 regards the sub-conditional clause as a search expression (step S2617). The search unit 305 uses the created search expression to search the CMDB 110 for data that is to be converted (step S2618), and the flow proceeds to step S2612.

At step S2603, if no unselected sub-conditional clauses are present (step S2603: NO), the flow proceeds to step S2701 depicted in FIG. 27.

As depicted in the flowchart in FIG. 27, the executing unit 307 judges whether the process request by the processing request received at step S2601 is for a deleting process (step S2701).

If the processing request is for a deleting process (step S2701: YES), the flow proceeds to step S2706. On the other hand, if the processing request is not for a deleting process (step S2701: NO), the converting unit 306 refers to the meta information table 1000 and judges whether the data formats of all of the search results in the search results table 800 have been converted to the new schema (step S2702).

If all of the data formats have been converted (step S2702: YES), the flow proceeds to step S2706. On the other hand, if not all of the data formats have been converted (step S2702: NO), the converting unit 306 converts the unconverted data formats in the search results table 800, from the former schema to the new schema (step S2703).

The determining unit 308 executes a simultaneous conversion determining process of determining the data whose format is to be converted together with the data that is to be converted (step S2704). The converting unit 306 converts the formats of the data determined as data to be subject to simultaneous conversion, from the former schema to the new schema (step S2705).

Finally, the executing unit 307 executes the process requested by the processing request (step S2706), ending the processing according to the flowchart.

Thus, when a processing request concerning the CMDB 110 is received, the format of the data that is to be converted can be converted from the former schema to the new schema, enabling the process requested by the processing request to be implemented appropriately.

Next, the judging process at step S2605 depicted in FIG. 26 will be described.

Figure 28:
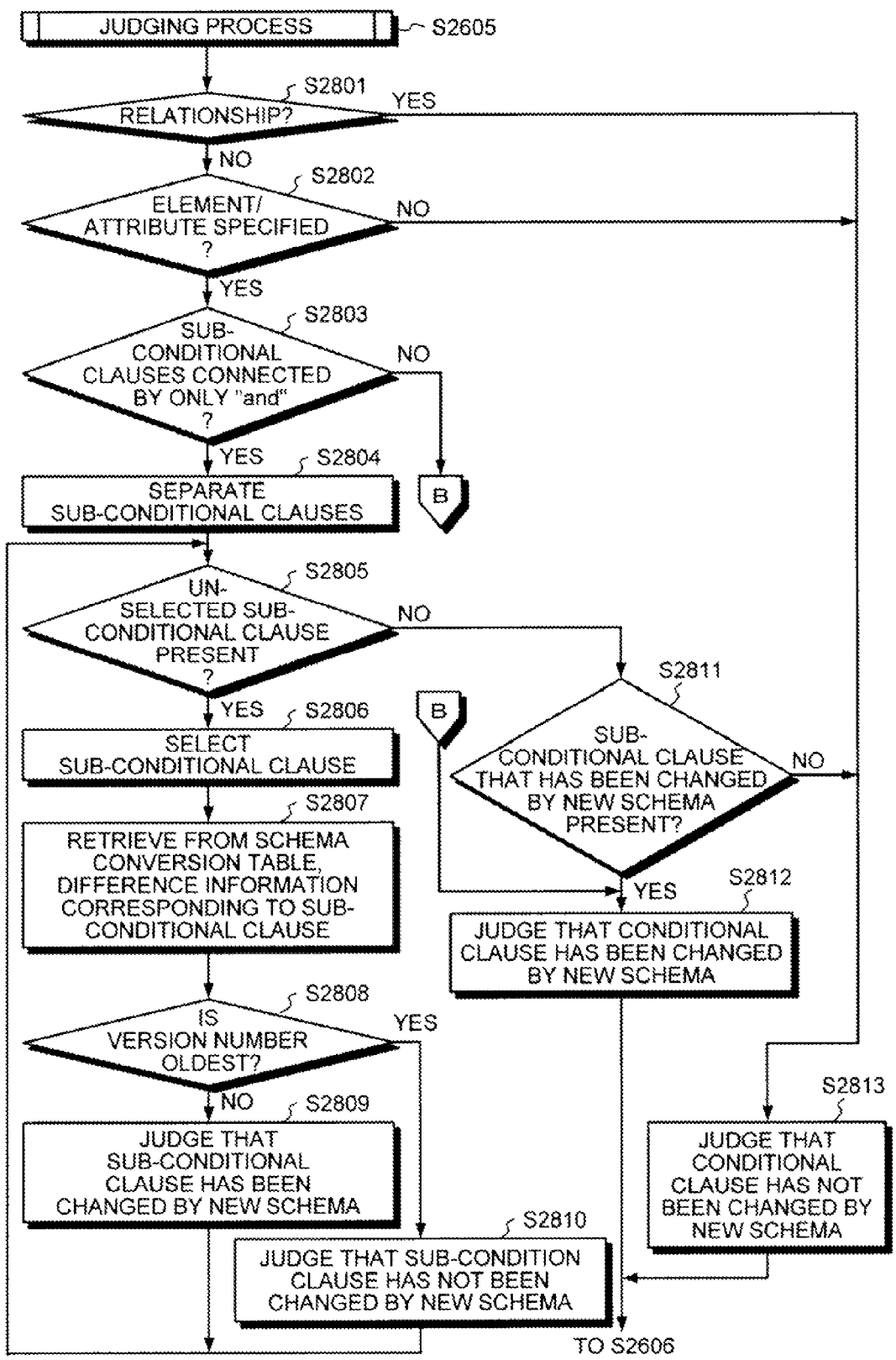
FIG. 28 is a flowchart of an example of a judging process at step S2605.

FIG. 28 is a flowchart of an example of the judging process at step S2605. As depicted in the flowchart in FIG. 28, the judging unit 303 judges whether the sub-conditional clause selected at step S2604 depicted in FIG. 26 is a conditional clause specifying a relationship (step S2801). Hereinafter, in the description of FIG. 28, "sub-conditional clause" may be simply referred to as "conditional clause".

If the conditional clause is one that specifies a relationship (step S2801: YES), the flow proceeds to step S2813. On the other hand, if conditional clause is not one that specifies a relationship (step S2801: NO), the judging unit 303 judges whether an element/attribute is specified in the selected conditional clause (step S2802).

If no element/attribute is specified (step S2802: NO), the flow proceeds to step S2813. On the other hand, if an element/attribute is specified (step S2802: YES), the judging unit 303 judges whether the selected conditional clause includes sub-conditional clauses connected by only "and" (step S2803).

If sub-conditional clauses connected by only "and" are not included (step S2803: NO), the flow proceeds to step S2812. On the other hand, if sub-conditional clauses connected by only "and" are included (step S2803: YES), the judging unit 303 separates the sub-conditional clauses (step S2804).

The judging unit 303 judges whether an unselected sub-conditional clause is present among the sub-conditional clauses (step S2805). If an unselected sub-conditional clause is present (step S2805: YES), the judging unit 303 selects an unselected sub-conditional clause (step S2806).

The judging unit 303 retrieves from the schema change table 500, difference information corresponding to the selected sub-conditional clause (step S2807). The judging unit 303 judges whether the version number of the retrieved difference information is the oldest version number (step S2808).

If the version number is not the oldest (step S2808: NO), the judging unit 303 judges that the sub-conditional clause has been changed by the new schema (step S2809), and the flow proceeds to step S2805.

On the other hand, if the version number is the oldest (step S2808: YES), the judging unit 303 judges that the sub-conditional clause has not been changed by the new schema (step S2810), and the flow proceeds to step S2805.

At step S2805, if no unselected sub-conditional clause is present (step S2805: NO), the judging unit 303 judges whether among the sub-conditional clauses, a sub-conditional clause is present that has been judged to have been changed by the new schema (step S2811).

If a sub-conditional clause is present that has been judged to have been changed by the new schema (step S2811: YES), the judging unit 303 judges that the sub-conditional clause selected at step S2604 has been changed by the new schema (step S2812), and the flow proceeds to step S2606 depicted in FIG. 26.

On the other hand, if no sub-conditional clause is present that has been judged to have been changed by the new schema (step S2811: NO), the judging unit 303 judges that the sub-conditional clause selected at step S2604 has not been changed by the new schema (step S2813), and the flow proceeds to step S2606 depicted in FIG. 26.

Thus, whether the condition in processing request and specifying the data to be processed has been changed by the new schema can be determined.

Next, using FIGS. 29 and 30, a procedure of the simultaneous conversion determining process at step S2704 depicted in FIG. 27 will be described.

Figure 29:
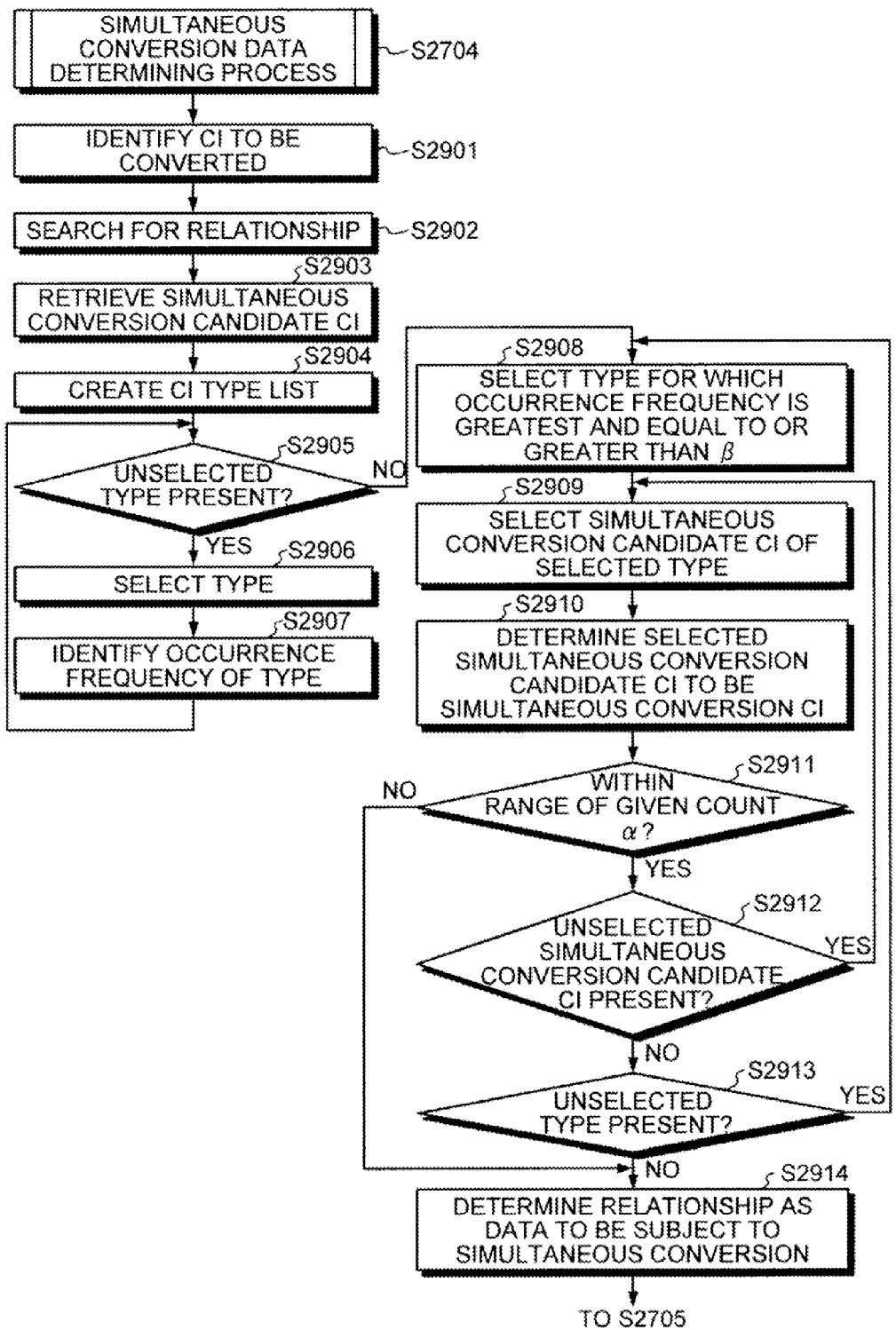
FIG. 29 is a flowchart of an example of a simultaneous conversion determining process at step S2704.

FIG. 29 is a flowchart of an example of the simultaneous conversion determining process at step S2704. As depicted in the flowchart in FIG. 29, from the search results table 800, the search unit 305 identifies a CI that is subject to conversion (step S2901).

The search unit 305 searches the CMDB 110 for, as a simultaneous conversion data candidate, a relationship that includes the ID of the identified CI subject to conversion (step S2902). The search unit 305 searches the CMDB 110 for a simultaneous conversion candidate CI(s) that is connected to the CI subject to conversion, by the retrieved relationship (step S2903). The retrieved simultaneous conversion candidate CI is stored to the simultaneous conversion candidate CI list 1700.

The determining unit 308 refers to the simultaneous conversion candidate CI list 1700 and creates a CI type list (e.g., the CI type list 1800) that lists the types of the simultaneous conversion candidate CIs (step S2904). The determining unit 308 judges whether an unselected type that has not yet been selected from the created CI type list 1800 is present (step S2905).

If an unselected type is present (step S2905: YES), the determining unit 308 selects from the CI type list 1800, an unselected type (step S2906). The determining unit 308 refers to a statistical table (e.g., the statistical table 1900) and identifies the occurrence frequency of the selected simultaneous conversion candidate CI (step S2907); and the flow returns to step S2905.

At step S2905, if no unselected type is present (step S2905: NO), the determining unit 308 selects a type whose occurrence frequency is greater than or equal to the threshold $\beta$ and largest among the respective occurrence frequencies of the simultaneous conversion candidate CIs, (step S2908). The determining unit 308 selects from the simultaneous conversion candidate CI list 1700, a simultaneous conversion candidate CI that is of the selected type (step S2909).

The determining unit 308 determines the selected simultaneous conversion candidate CI to be a simultaneous conversion CI (step S2910). A simultaneous conversion CI is data that is to be subject to simultaneous conversion. Subsequently, the determining unit 308 judges whether the data count of the determined simultaneous conversion CIs is within a given count $\alpha$ (step S2911). If the data count is not within the given count $\alpha$ (step S2911: NO), the flow proceeds to step S2914.

On the other hand, if the data count is within the given count $\alpha$ (step S2911: YES), the determining unit 308 judges whether among the simultaneous conversion candidate CIs of the selected type, an unselected simultaneous conversion candidate CI is present that has yet to be selected (step S2912). If an unselected simultaneous conversion candidate CI is present (step S2912: YES), the flow returns to step S2909.

On the other hand, if no unselected simultaneous conversion candidate CI is present (step S2912: NO), the determining unit 308 judges whether an unselected type is present whose occurrence frequency is greater than or equal to the threshold β (step S2913). If such an unselected type is present (step S2913: YES), the flow returns to step S2908.

On the other hand, if no such unselected type is present (step S2913: NO), the determining unit 308 determines a relationship that expresses the association between the CI subject to conversion and the simultaneous conversion CI to be data to be subject to simultaneous conversion (step S2914), and the flow proceeds to step S2705 depicted in FIG. 27.

Thus, as the condition specifying the data to be processed, the data format of a CI that is specified at a high frequency together with the CI subject to conversion and the relationship associating the CIs, can be converted from the former schema to the new schema.

FIG. 30 is a flowchart of an example of the simultaneous conversion determining process at step S2704. As depicted in the flowchart in FIG. 30, the search unit 305 identifies from the search results table 800, the CI to be converted (step S3001).

The search unit 305 searches the CMDB 110 for (as simultaneous conversion data candidate) a relationship that includes the ID of the identified CI to be converted (step S3002). The search unit 305 further searches the CMDB 110 for a simultaneous conversion candidate CI connected, by the retrieved relationship, to the CI to be converted (step S3003). The retrieved simultaneous conversion candidate CIs are stored to the simultaneous conversion candidate CI list 2200.

The determining unit 308 refers to the simultaneous conversion candidate CI list 2200 and creates an association list (for example, the association list 2300) (step S3004). Subsequently, the determining unit 308 judges whether pair information that has not been selected from the association list 2300 is present (step S3005).

Here, if unselected pair information is present (step S3005: YES), the determining unit 308 selects from the association list 2300, pair information that has yet to be selected (step S3006) and searches the rule list 2400 for a rule applicable to the association class corresponding to the selected pair information (step S3007).

The determining unit 308 judges whether a rule applicable to the association class corresponding to the selected pair information has been retrieved (step S3008). Here, if no rule has been retrieved (step S3008: NO), the flow returns to step S3005. On the other hand, if a rule has been retrieved (step S3008: YES), the determining unit 308 refers to the simultaneous conversion candidate CI list 2200 and identifies a simultaneous conversion candidate CI of the type of the CI identified as the source from the pair information (step S3009).

In the simultaneous conversion candidate CI list 2200, the determining unit 308 adds to the Point field of the identified simultaneous conversion candidate CI, the number of rules (applicable to the association class) retrieved at step S3007 (step S3010).

The determining unit 308 refers to the simultaneous conversion candidate CI list 2200 and identifies a simultaneous conversion candidate CI of the type of the CI that is identified, from the pair information, to be the destination (step S3011). In the simultaneous conversion candidate CI list 2200, the determining unit 308 adds to the Point field of the identified simultaneous conversion candidate CI, the number of rules retrieved at step S3007 (step S3012); and the flow returns to step S3005.

At step S3005, if no unselected pair information is present (step S3005: NO), the determining unit 308 selects from the simultaneous conversion candidate CI list 2200, an unselected simultaneous conversion candidate CI whose point value is the largest and greater than or equal to the threshold γ (step S3013). The determining unit 308 determines the selected simultaneous conversion candidate CI to be a simultaneous conversion CI (step S3014). A simultaneous conversion CI is data that is to be subject to simultaneous conversion.

Subsequently, the determining unit 308 judges whether the data count of the determined simultaneous conversion CIs is within a given count α (step S3015). Here, if the data count is not within the given count α (step S3015: NO), the flow proceeds to step S3017.

On the other hand, if the data count is within the given count α (step S3015: YES), the determining unit 308 judges whether an unselected simultaneous conversion candidate CI whose point value is greater than or equal to the threshold γ is present (step S3016). If such an unselected simultaneous conversion candidate CI is present (step S3016: YES), the flow returns to step S3013.

On the other hand, if no such unselected simultaneous conversion candidate CI is present (step S3016: NO), the determining unit 308 determines a relationship that expresses the association between the CI subject to conversion and the simultaneous conversion CI, to be data to be subject to simultaneous conversion (step S3017), and the flow proceeds to step S2705 in FIG. 27.

Thus, among the simultaneous conversion candidate CIs, the data format of a CI that is targeted by a processing request that specifies a point of failure, can be converted from the former schema to the new schema.

As described, according to the data conversion apparatus 100 of the embodiment, based on the differences between the former schema and the new schema of the CMDB 110, it can be judged whether the condition in the processing request and specifying the data to be processed, has been changed by the new schema; and according to the results of the judgment, data whose format is to be converted corresponding a CMDB 110 schema change, can be retrieved from the CMDB 110.

As a result, when a processing request concerning the CMDB 110 is received, the format of the data to be converted can be converted from the former schema to the new schema, enabling the process requested by the processing request to be implemented appropriately. In other words, when a processing request concerning the CMDB 110 is received, the least amount of data necessary to implement the requested process is converted, whereby the format of the data in the CMDB 110 can be converted stepwise according to each new schema.

According to the data conversion apparatus 100, when the condition specifying the data to be processed has not been changed by the new schema, a search expression for retrieving the data to be converted can be created based on the character string representing the condition. Consequently, the format of the data to be converted can be converted to the new schema.

Further, according to the data conversion apparatus 100, when the condition specifying the data to be processed has been changed by the new schema, the condition is converted to a condition corresponding to the former schema and a search expression for retrieving the data to be converted is created. Consequently, the format of the data to be converted can be converted to the new schema.

Additionally according to the data conversion apparatus 100, when the condition specifying the data to be processed has been changed by the new schema, a search expression for retrieving the data to be converted can be created based on the character string representing the highest level condition among a hierarchy of conditions. Consequently, the format of each data in a data set that includes the data to be converted, can be converted to the new schema.

According to the data conversion apparatus 100, a CI associated with the CI subject to conversion by a relationship, can be retrieved from the CMDB 110. Consequently, the data formats of the CI subject to conversion, an associated CI, and the relationship expressing the association therebetween, can be converted to the new schema.

According to the data conversion apparatus 100, when multiple simultaneous conversion candidate CIs are retrieved, a simultaneous conversion CI can be determined from among the multiple simultaneous conversion candidate CIs, based on the respective occurrence frequencies of the simultaneous conversion candidate CIs specified together with the CI to be converted, as a condition specifying the data to be processed. Consequently, among multiple simultaneous conversion candidate CIs, a simultaneous conversion candidate CI that is specified at a high frequency together with the CI to be converted can be preferentially determined as a simultaneous conversion CI. Further, by narrowing down the data to be subject to simultaneous conversion, increases in the time consumed to perform the process requested by a processing request can be suppressed.

According to the data conversion apparatus 100, an occurrence frequency for each simultaneous conversion candidate CI that is specified together with the CI to be converted, can be calculated based on log information related to processing requests concerning the CMDB 110.

According to the data conversion apparatus 100, simultaneous conversion CIs up to a preliminarily set given count $\alpha$, can be determined from among multiple simultaneous conversion candidate CIs. Consequently, increases in the number of data to be subject to simultaneous conversion can be suppressed and increases in the time consumed until implementation of the process requested at the receipt of a processing request, can be suppressed.

According to the data conversion apparatus 100, among the simultaneous conversion candidate CIs, the data format of a CI targeted for processing by a processing request that specifies a failure point in the system, can be converted from the former schema to the new schema. Consequently, system configuration can be correctly grasped when a failure is addressed, enabling identification of the point of failure.

According to the embodiments, without suspending service when the schema of the CMDB 110 changes, the data in the CMDB 110 can be transitioned stepwise to the latest schema.

The conversion method described in the present embodiment may be implemented by executing a program on a computer such as a personal computer and a workstation. The program is stored on a computer-readable medium such as a hard disk, a flexible disk, a CD-ROM, an MO, and a DVD, read out from the recording medium, and executed by the computer. The program may be distributed through a network such as the Internet. However, the computer-readable medium does not include a transitory medium such as a propagation signal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable medium storing therein a data conversion program that causes a computer to execute a process comprising:
   receiving after a schema of a database has been changed from a former schema to a new schema, a processing request concerning the database;
   judging based on difference information concerning the former schema and the new schema, whether in the processing request, a condition that specifies process data to be processed has been changed by the new schema;
   creating, when judgment results obtained at the judging indicate that the condition has been changed by the new schema, a search expression by converting the condition into a condition that corresponds to the former schema;
   searching the database for conversion data whose format is to be converted from the former schema to the new schema in accordance with the created search expression, the searching based on the judgment results obtained at the judging and on the processing request; and
   converting the format of the conversion data searched at the searching, from the former schema to the new schema, wherein the database stores therein data related to configuration items of a system and data related to relationships expressing associations between the configuration items,
   the process further comprises
   executing retrieval of data related to a second configuration item that is associated, by a relationship, with the conversion data that is retrieved at the searching and related to a first configuration item; and
   determining which data retrieved at the executing retrieval is to be subject to conversion, when data related to a plurality of second configuration items is retrieved at the executing retrieval, the determining based on index values indicating respective occurrence frequencies of the second configuration items, and
   the converting includes converting, from the former schema to the new schema, the format of the determined data and the format of the data related to the relationship expressing association between the first configuration item and the second configuration item indicated by the determined data.

2. The computer-readable medium according to claim 1, the process further comprising:
   creating, based on a character string representing the condition and when the judgment results indicate that the condition has not been changed by the new schema, a search expression for retrieving the conversion data, wherein
   the searching includes using the created search expression to search the database for the conversion data.

3. The computer-readable medium according to claim 2, wherein the creating, when the judgment results indicate that the condition has been changed by the new schema, includes creating the search expression, based on the character string representing the highest level condition among hierarchized conditions specifying the process data.

4. The computer-readable medium according to claim 2, wherein the creating, when the judgment results indicate that the condition has been changed by the new schema, includes creating the search expression by converting the condition into a condition that corresponds to the former schema.

5. The computer-readable medium according to claim 1, the process further comprising calculating the index values, based on log information related to processing requests that specify at least the first configuration item as the condition specifying the process data, among past processing requests concerning the database, wherein
the determining includes determining, based on the calculated index values that respectively represent the occurrence frequencies of the second configuration items, the data to be subject to conversion.

6. The computer-readable medium according to claim 1, wherein the determining includes determining within a given data count, the data to be subject to conversion.

7. The computer-readable medium according to claim 1, wherein the determining includes determining from among the retrieved data related to the second configuration items, the process data of the processing request that specifies a failure point in the system.

8. The computer-readable medium according to claim 1, the process further comprising executing a process requested by the received processing request on the process data included among the conversion data whose format has been converted at the converting.

9. A data conversion apparatus comprising:
central processing unit (CPU);
a receiving unit that after a schema of a database has been changed from a former schema to a new schema, receives a processing request concerning the database;
a judging unit that based on difference information concerning the former schema and the new schema, judges whether in the processing request, a condition that specifies process data to be processed has been changed by the new schema;
a creating unit that creates, when judgment results obtained by the judging unit indicate that the condition has been changed by the new schema, a search expression by converting the condition into a condition that corresponds to the former schema;
a search unit that based on the judgment results obtained by the judging unit and on the processing request, searches the database for conversion data whose format is to be converted from the former schema to the new schema in accordance with the created search expression;
a converting unit that converts the format of the conversion data searched by the searching unit, from the former schema to the new schema, wherein the database stores therein data related to configuration items of a system and data related to relationships expressing associations between the configuration items;
an executing unit that executes retrieval of data related to a second configuration item that is associated, by a relationship, with the conversion data that is retrieved by the searching unit and related to a first configuration item; and
a determining unit that determines which data retrieved by the executing unit is to be subject to conversion, when data related to a plurality of second configuration items is retrieved by the executing unit, based on index values indicating respective occurrence frequencies of the second configuration items, and
the converting unit converts, from the former schema to the new schema, the format of the determined data and the format of the data related to the relationship expressing association between the first configuration item and the second configuration item indicated by the determined data.

10. A data conversion method executed by a computer, the data conversion method comprising:
receiving after a schema of a database has been changed from a former schema to a new schema, a processing request concerning the database;
judging based on difference information concerning the former schema and the new schema, whether in the processing request, a condition that specifies process data to be processed has been changed by the new schema;
creating, when judgment results obtained at the judging indicate that the condition has been changed by the new schema, a search expression by converting the condition into a condition that corresponds to the former schema;
searching the database for conversion data whose format is to be converted from the former schema to the new schema in accordance with the created search expression, the searching based on the judgment results obtained at the judging and on the processing request; and
converting the format of the conversion data searched at the searching, from the former schema to the new schema, wherein the database stores therein data related to configuration items of a system and data related to relationships expressing associations between the configuration items,
the data conversion method further comprises
executing retrieval of data related to a second configuration item that is associated, by a relationship, with the conversion data that is retrieved at the searching and related to a first configuration item; and
determining which data retrieved at the executing retrieval is to be subject to conversion, when data related to a plurality of second configuration items is retrieved at the executing retrieval, the determining based on index values indicating respective occurrence frequencies of the second configuration items, and
the converting includes converting, from the former schema to the new schema, the format of the determined data and the format of the data related to the relationship expressing association between the first configuration item and the second configuration item indicated by the determined data.

* * * * *